(12) United States Patent
Suzaki et al.

(10) Patent No.: US 7,609,460 B2
(45) Date of Patent: Oct. 27, 2009

(54) ZOOM LENS AND IMAGING APPARATUS

(75) Inventors: Mitsuhiro Suzaki, Tokyo (JP); Yusuke Nanjo, Kanagawa (JP); Shinichi Arita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/292,366

(22) Filed: Nov. 18, 2008

(65) Prior Publication Data
US 2009/0168193 A1    Jul. 2, 2009

(30) Foreign Application Priority Data
Dec. 26, 2007   (JP)   ............................ 2007-334755

(51) Int. Cl.
*G02B 9/60* (2006.01)
(52) U.S. Cl. .................. 359/764; 359/676; 359/708; 359/714; 359/733; 359/763
(58) Field of Classification Search ................. 359/708, 359/714, 733, 740, 763, 764
See application file for complete search history.

(56) References Cited

U.S. PATENT DOCUMENTS 7,277,629 B2 * 10/2007 Nishina ...................... 396/72

FOREIGN PATENT DOCUMENTS

JP    2006-098963    4/2006

* cited by examiner

*Primary Examiner*—Joseph Martinez
(74) *Attorney, Agent, or Firm*—Rader, Fishman & Grauer PLLC

(57) ABSTRACT

A zoom lens configured by arranging a first lens group, a second lens group, a third lens group, a fourth lens group, and a fifth lens group in order from the object side to the image side, and further having an aperture diaphragm on the object side of the third lens group. In the first lens group, a first lens, a second lens, and a third lens are located in order from the object side to the image side. In the second lens group, a fourth lens, a fifth lens, and a sixth lens are located in order from the object side to the image side. The third lens group is made up of a seventh lens which is a convex lens, the fourth lens group is made up of at least two or more cemented lenses, the third lens group and the fourth lens group include at least one surface formed into an aspherical surface.

6 Claims, 23 Drawing Sheets

COMA ABERRATION

COMA ABERRATION

COMA ABERRATION

COMA ABERRATION

ZOOM LENS AND IMAGING APPARATUS

BACKGROUND OF THE INVENTION

1. Field of the Invention

The present invention relates to a zoom lens and an imaging apparatus. More particularly, the present invention relates to an a zoom lens and an imaging apparatus having a so-called vibration-proof function in which a blur of a photographed image is optically corrected when vibrated to obtain an image free from a blur by moving a part of lens groups so as to have a component in a direction perpendicular to an optical axis, thereby resulting in stabilization of the photographed image, and further having a higher variable power ratio of about 15 to 20 times.

2. Description of Related Art

During photographing of an imaging apparatus, such as a still camera, a video camera and the like, for example, the occurrence of camera shake attributed to shutter operation or shake caused by transmitting vibration to a photographing system when a subject is photographed from a moving object such as a car results in a blur on a photographed image. As means for correcting the above-described image blur resulting from the camera shake, there has been known a shake-correcting optical system that by moving (shifting) a part of lens groups making up a lens system in a direction substantially perpendicular to an optical axis, displaces an image position to correct the image blur, and also corrects deterioration in optical performance occurring when the image position is displaced.

As the above-described camera shake-correcting optical system, for example, there is one described in Japanese Patent Application Laid-Open No. 2006-98963, Patent Document 1. In a shake-correcting optical system described in Patent Document 1, a zoom lens includes first to fourth lens groups having positive, negative, positive, and positive refractive powers, respectively, and a fifth lens group made up of a negative part group having a negative refractive power and a positive part group having a positive refractive power. These first to fifth lens groups are arrayed in order from the object side to the image side, and the positive part group of the fifth lens group is moved in the direction substantially perpendicular to the optical axis to thereby perform vibration control.

SUMMARY OF THE INVENTION

However, in the zoom lens in the shake-correcting optical system described in Patent Document 1, the negative part group of the fifth lens group is made up of one negative lens, and thus, the refractive power of the negative part group is strong, which makes large a refractive power difference from a lens closest to the image of the positive part group of the fifth lens group. Accordingly, there has been an issue of increased deterioration in image formation performance, which is caused by relative decentering between the negative part group of the fifth lens group and the lens closest to the image of the positive part group of the fifth lens group.

Moreover, in the imaging apparatus, when the variable power ratio is set to 10 times or more, there arises need to increase a movement amount of the second lens group. However, this has an issue that corresponding to this movement amount of the second lens group, there also arises need to increase a movement amount of the fourth lens group, which makes fluctuations in aberration large with this, and thus, makes the correction of aberration in the entire zoom area difficult, so that it is difficult to achieve higher performance and higher variable power.

Consequently, in a zoom lens and an imaging apparatus according to the present invention, it is desirable to overcome the above-described issues, and to achieve higher performance and higher variable power in the entire zoom area of a wide angle end to a telephoto end.

In order to realize the above-described desire, a zoom lens is configured by arranging a first lens group that has a positive reflective power and is fixed with respect to an optical axis direction, a second lens group that has a negative refractive power and performs a variable power action by moving on an optical axis, a third lens group that has a positive refractive power and is fixed with respect to the optical axis direction, a fourth lens group that has a positive refractive power, and corrects fluctuations in image formation position and in addition, corrects fluctuations in image formation position with changes in object distance by moving on the optical axis, and a fifth lens group that has a positive refractive power and is fixed with respect to the optical axis direction in order from the object side to the image side. The zoom lens further has an aperture diaphragm on the object side of the third lens group. In the first lens group, a first lens which is a concave meniscus lens with a convex surface facing the object side, a second lens which is a convex lens cemented to the first lens, and a third lens which is a convex meniscus lens with a convex surface facing the object side are located in order from the object side to the image side, and in the second lens group, a fourth lens which is a concave meniscus lens with a convex surface facing the object side, a fifth lens which is a biconcave lens, and a sixth lens which is a convex lens cemented to the fifth lens are located in order from the object side to the image side. The third lens group is made up of a seventh lens which is a convex lens, the fourth lens group is made up of at least two or more cemented lenses, and the third lens group and the fourth lens group include at least one surface formed into an aspherical surface. In the fifth lens group, a 5a-th lens group having a negative refractive power, a 5b-th lens group having a negative refractive power, and a 5c-th lens group having a positive refractive power are located in order from the object side to the image side. The 5a-th lens group is made up of two negative lenses, and the 5b-th lens group can be moved so as to have a component in a direction perpendicular to the optical axis, and displace an image. In addition, the zoom lens satisfies the following conditional expressions (1) to (4):

$$0.8 < f3/f4 < 1.5 \tag{1}$$

$$0.15 < fw/\phi1 < 0.17 \tag{2}$$

$$-3.0 < f5c/f5a < -1.5 \tag{3}$$

$$0.15 < |\{1-(\beta a)^2\} \cdot (\beta b)^2| < 0.45 \tag{4}$$

where f3 is a composite focal distance of the third lens group, f4 is a composite focal distance of the fourth lens group, fw is a focal distance in the entire lens system in a wide angle end state, $\phi1$ is an effective diameter of an object side surface of the first lens, f5c is a composite focal distance of the 5c-th lens group, f5a is a composite focal distance of the 5a-th lens group, βa is a lateral magnification of the 5a-th lens group, and βb is a lateral magnification of the 5b-th lens group.

Accordingly, in the zoom lens, favorable aberration correction in a zoom area is enabled, and performance deterioration due to backlash of the shake correction group in the optical axis direction is alleviated.

It is desirable that in the above-described zoom lens, the fourth lens group be made up of cemented lenses in which an eighth lens which is a convex lens with a convex surface facing the object side, a ninth lens which is a concave lens, and a tenth lens which is a convex lens are cemented in order from the object side, and at least a surface of the fourth lens group closest to an object is formed into an aspherical surface.

This reduces an incident angle of a luminous flux with respect to the imaging element arranged on the image side of the lens system, which prevents shading from occurring.

It is desirable that in the above-described zoom lens satisfy the following conditional expression (5):

$$0.95 < f4/(fw \cdot ft)^{1/2} < 1.3 \tag{5}$$

where ft is a focal distance in the entire lens system in a telephoto end state.

This assures a sufficient space in the optical axis that the fourth lens group requires for the movement during variation of the power.

It is desirable that the above-described zoom lens satisfy the following conditional expression (6):

$$1.1 < f3/(fw \cdot ft)^{1/2} < 1.5 \tag{6}$$

This allows an angle of view at the wide angle end while performing favorable aberration correction.

It is desirable that the above-described zoom lens satisfy the following conditional expressions (7) and (8):

$$8.5 < f1/fw < 10 \tag{7}$$

$$-0.45 < f2/(fw \cdot ft)^{1/2} < -0.3 \tag{8}$$

where f1 is a composite focal distance of the first lens group, and f2 is a composite focal distance of the second lens group.

This allows reduction in entire lens length to be realized while achieving a higher variable power. In order to realize the above-described desire, an imaging apparatus includes a zoom lens and an imaging element that converts an optical image formed by the zoom lens to an electric signal. The zoom lens is configured by arranging a first lens group that has a positive reflective power and is fixed with respect to an optical axis direction, a second lens group that has a negative refractive power and performs a variable power action by moving on an optical axis, a third lens group that has a positive refractive power and is fixed with respect to the optical axis direction, a fourth lens group that has a positive refractive power, and corrects fluctuations in image formation position and in addition, corrects fluctuations in image formation position with changes in accordance with object distance by moving on the optical axis, and a fifth lens group that has a positive refractive power and is fixed with respect to the optical axis direction in order from the object side to the image side. The zoom lens further has an aperture diaphragm on the object side of the third lens group. In the first lens group, a first lens which is a concave meniscus lens with a convex surface facing the object side, a second lens which is a convex lens cemented to the first lens, and a third lens which is a convex meniscus lens with a convex surface facing the object side are located in order from the object side to the image side, and in the second lens group, a fourth lens which is a concave meniscus lens with a convex surface facing the object side, a fifth lens which is a biconcave lens, and a sixth lens which is a convex lens cemented to the fifth lens are located in order from the object side to the image side. The third lens group is made up of a seventh lens which is a convex lens, the fourth lens group is made up of at least two or more cemented lenses, and the third lens group and the fourth lens group include at least one surface formed into an aspherical surface. In the fifth lens group, a 5a-th lens group having a negative refractive power, a 5b-th lens group having a negative refractive power, and a 5c-th lens group having a positive refractive power are located in order from the object side to the image side. The 5a-th lens group is made up of two negative lenses, and the 5b-th lens group can be moved so as to have a component in a direction perpendicular to the optical axis, and displace an image. In addition, the zoom lens satisfies the following conditional expressions (1) to (4):

$$0.8 < f3/f4 < 1.5 \tag{1}$$

$$0.15 < fw/\phi1 < 0.17 \tag{2}$$

$$-3.0 < f5c/f5a < -1.5 \tag{3}$$

$$0.15 < |\{1-(\beta a)^2\} \cdot (\beta b)^2| < 0.45 \tag{4}$$

where f3 is a composite focal distance of the third lens group, f4 is a composite focal distance of the fourth lens group, fw is a focal distance in the entire lens system in a wide angle end state, φ1 is an effective diameter of an object side surface of the first lens, f5c is a composite focal distance of the 5c-th lens group, f5a is a composite focal distance of the 5a-th lens group, βa is a lateral magnification of the 5a-th lens group, and βb is a lateral magnification of the 5b-th lens group.

Accordingly, in the zoom lens, favorable aberration correction in the zoom area is enabled, and performance deterioration due to backlash of the shake correction group in the optical axis direction is alleviated.

In the zoom lens and the imaging apparatus of the present invention, a higher variable power can be achieved and at the same time, higher performance can be achieved while assuring a favorable shake correction function.

DETAILED DESCRIPTION OF THE EMBODIMENTS

Figure 1:
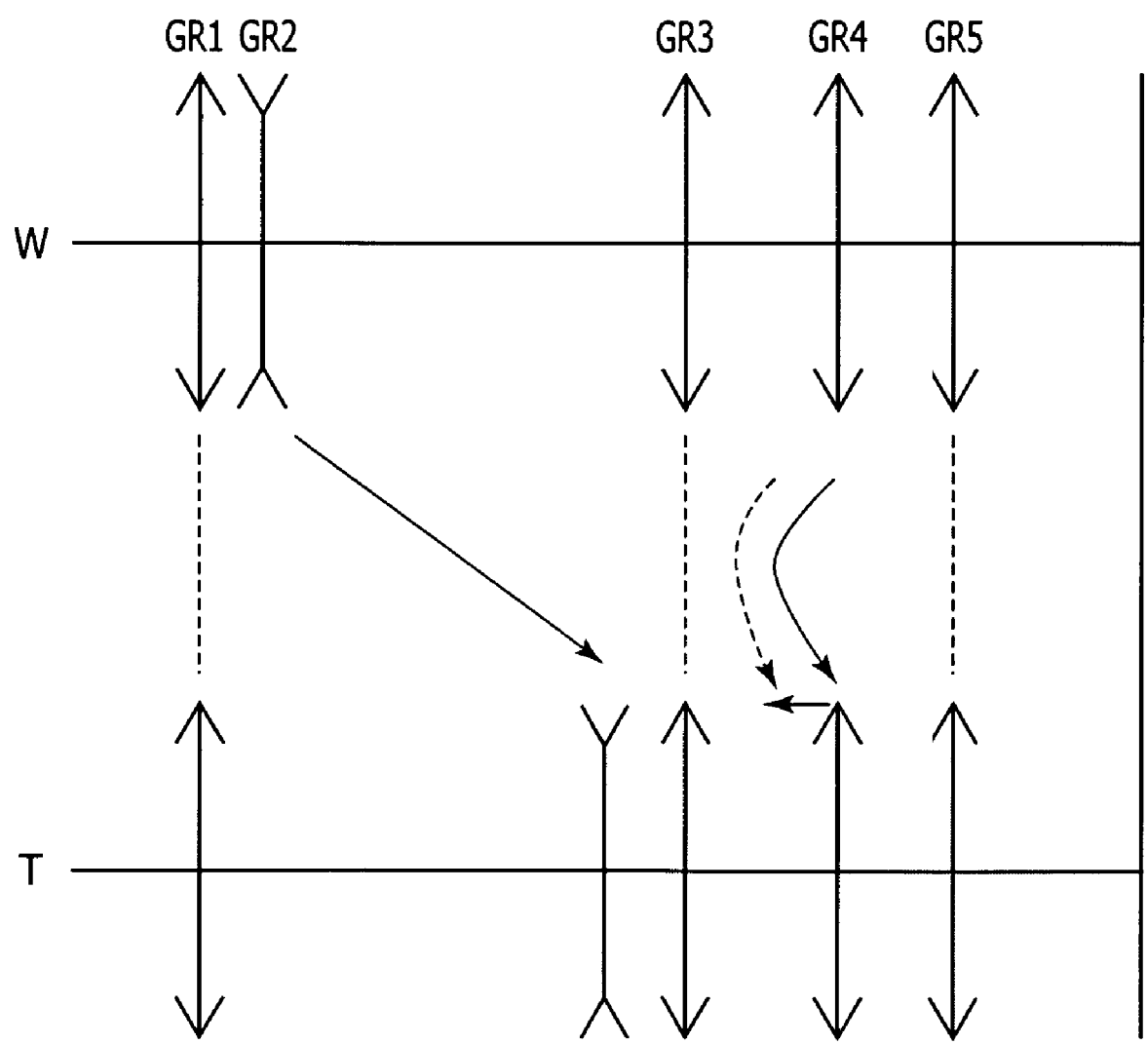
FIG. 1 is a diagram showing a best mode for carrying out an imaging apparatus and a zoom lens of the present invention together with FIGS. 2 to 23, this figure showing refractive power arrangement of the zoom lens.

Hereinafter, referring to the drawings, a best mode for carrying out a zoom lens and an imaging apparatus of the present invention is described.

The zoom lens of the present invention is first described.

The zoom lens of the present invention is configured by arranging a first lens group that has a positive reflective power and is fixed with respect to an optical axis direction, a second lens group that has a negative refractive power and performs a variable power action by moving on an optical axis, a third lens group that has a positive refractive power and is fixed with respect to the optical axis direction, a fourth lens group that has a positive refractive power, and corrects fluctuations in image formation position and in addition, corrects fluctuations in image formation position in accordance with changes in object distance by moving on the optical axis direction, and a fifth lens group that has a positive refractive power and is fixed with respect to the optical axis direction in order from the object side to the image side, and further the zoom lens has an aperture diaphragm on the object side of the third lens group.

In the first lens group, a first lens which is a concave meniscus lens with a convex surface facing the object side, a second lens which is a convex lens cemented to the first lens, and a third lens which is a convex meniscus lens with a convex surface facing the object side are located in order from the object side to the image side.

In the second lens group, a fourth lens which is a concave meniscus lens with a convex surface facing the object side, a fifth lens which is a biconcave lens, and a sixth lens which is a convex lens cemented to the fifth lens are located in order from the object side to the image side.

The third lens group is made up of a seventh lens which is a convex lens, the fourth lens group is made up of at least two or more cemented lenses, and the third lens group and the fourth lens group include at least one surface formed into an aspherical surface.

In the fifth lens group, a 5a-th lens group having a negative refractive power and a 5b-th lens group having a negative refractive power, and a 5c-th lens group having a positive refractive power are located in order from the object side to the image side. The 5a-th lens group is made up of two negative lenses, and the 5b-th lens group can be moved so as to have a component in a direction perpendicular to the optical axis, and displace an image.

The zoom lens configured as described above satisfies the following conditional expressions (1) to (4):

$$0.8 < f3/f4 < 1.5 \quad (1)$$

$$0.15 < fw/\phi 1 < 0.17 \quad (2)$$

$$-3.0 < f5c/f5a < -1.5 \quad (3)$$

$$0.15 < |\{1-(\beta a)^2\} \cdot (\beta b)^2| < 0.45 \quad (4)$$

where f3 is a composite focal distance of the third lens group, f4 is a composite focal distance of the fourth lens group, fw is a focal distance in the entire lens system in a wide angle end state, $\phi 1$ is an effective diameter of an object side surface of the first lens, f5c is a composite focal distance of the 5c-th lens group, f5a is a composite focal distance of the 5a-th lens group, $\beta a$ is a lateral magnification of the 5a-th lens group, and $\beta b$ is a lateral magnification of the 5b-th lens group.

Accordingly, in the zoom lens of the present invention, the second lens group is moved in the optical axis direction to vary power, the fourth lens group is moved in the optical axis direction to correct fluctuations in image formation position with the power variation, and in addition, the fourth lens group is moved to perform focusing, by which effective utilization of a space between the third lens group and the fourth lens group is achieved, so that reduction in entire lens length can be effectively attained.

Moreover, by satisfying the conditional expressions (1) to (4), reduction in entire lens length, assurance of favorable aberration correction at the wide angle end and in the intermediate focus area, and alleviation of performance deterioration caused by relative decentering of the 5a-th lens group and the 5c-th lens group during assembling of the lens system, and alleviation of performance deterioration caused by backlash of the shake correction group in the optical axis direction can be achieved, so that a higher variable power can be achieved, and at the same time, higher performance can be achieved while assuring a favorable shake correction function.

The conditional expression (1) is an expression that defines a refractive power of the third lens group that has a positive refractive power and is fixed with respect to the optical axis direction, and a refractive power of the fourth lens group that moves for correction of a focal position and focusing.

If f3/f4 in the conditional expression (1) becomes 0.8 or less, the refractive power of the third lens group becomes too strong, or the refractive power of the fourth lens group becomes too weak. If the refractive power of the third lens group become too strong, the correction of spherical aberration becomes insufficient on the wide angle side, and the correction of the spherical aberration for fluctuations during focusing becomes difficult in an intermediate position of the zoom area. If the refractive power of the fourth lens group becomes too weak, a movement amount during focusing becomes large, and aberration fluctuations in field curvature, coma aberration and the like become large. Moreover, if the refractive power of the fourth lens group becomes too weak, a back focus becomes longer than necessary, thereby hindering the reduction in optical entire length.

On the contrary, if f3/f4 in the conditional expression (1) become 1.5 or more, the refractive power of the third lens group becomes too weak, or the refractive power of the fourth lens group becomes too strong. If the refractive power of the third lens group becomes too weak, the correction of the spherical aberration on the wide angle side becomes excessive. If the refractive power of the fourth lens group becomes too strong, the correction of the spherical aberration on the wide angle side becomes insufficient.

The conditional expression (2) is an expression that defines proper balance between a diameter of the first lens group and the focal distance at the wide angle end for forming a small-sized, wide angle zoom lens.

If fw/φ1 in the conditional expression (2) becomes 0.15 or less, the zoom lens becomes large.

On the contrary, if fw/φ1 in the conditional expression (2) becomes 0.17 or more, the zoom lens becomes closer to the telephoto side, and thus, a wide angle is disabled from being obtained.

The conditional expression (3) is an expression that defines a range of a ratio between a refractive power of the 5c-th lens group and a refractive power of the 5a-th lens group, and is intended to shorten the entire lens length and alleviate deterioration in image formation performance due to relative decentering between the 5a-th lens group and the 5c-th lens group.

If f5c/f5a in the conditional expression (3) becomes −1.5 or more, the refractive power of the 5a-th lens group becomes small, and at the same time, the refractive power of the 5c-th lens group becomes large, and thus, a difference in the refractive power between the 5a-th lens group and the 5c-th lens group becomes large, and deterioration in image formation performance due to the relative decentering between the 5a-th lens group and the 5c-th lens group becomes large.

On the contrary, if f5c/f5a in the conditional expression (3) becomes −3.0 or less, the refractive power of the 5a-th lens group becomes large, and at the same time, the refractive power of the 5c-th lens group becomes small. The entire lens length, thus, increases, and the difference in the refractive power between the 5a-th lens group and the 5c-th lens group becomes large, so that deterioration in image formation performance due to the relative decentering between the 5a-th lens group and the 5c-th lens group becomes large.

The conditional expression (4) is an expression which defines a relation between a lateral magnification of the 5b-th lens group and a lateral magnification of the 5c-lens group.

If $|\{1-(\beta a)^2\}\cdot(\beta b)^2|$ becomes 0.45 or more, the movement in the optical axis direction of the lens groups for performing blur correction deteriorates the image formation performance.

On the contrary, if $|\{1-(\beta a)^2\}\cdot(\beta b)^2|$ becomes 0.15 or less, the movement amounts of the lens groups for performing blur correction are increased, and a size of a lens barrel in a radial direction is increased.

In the zoom lens according to the one embodiment of the present invention, while the fourth lens group is made up of at least two or more cemented lenses as described above, the fourth lens group is desirably made up of three convex, concave, and convex lenses.

This makes an exit-pupil distance long, and an outgoing luminous flux from the lens system telecentric, which can make smaller an incident angle of the luminous flux with respect to the imaging element arranged on the image side of the lens system to thereby prevent shading from occurring.

Moreover, by making up the fourth lens group by the three convex, concave and convex lenses, and cementing both front and back surfaces of the concave lens to the convex lenses, respectively, a freedom degree of a range of curvature of the concave lens can be dramatically increased, so that curving of colors in spherical aberration arising from both the surfaces of the concave lens can be remarkably improved.

Furthermore, by forming a surface of the fourth lens group closest to the object into an aspherical surface, high-order spherical aberration and coma aberration can be produced to improve the image formation performance.

In the zoom lens according to the one embodiment of the present invention, it is desirable to satisfy the following conditional expression (5):

$$0.95 < f4/(fw \cdot ft)^{1/2} < 1.3 \qquad (5)$$

where ft is a focal distance in the entire lens system in a telephoto end state.

This can assure a sufficient space in the optical axis direction that the fourth lens group requires for the movement during power variation.

The conditional expression (5) is an expression that defines a focal distance relating to the fourth lens group.

If $f4/(fw \cdot ft)^{1/2}$ in the conditional expression (5) becomes 1.3 or more and the focal distance becomes long, the fourth lens group becomes too close to the fifth lens group arranged on the image side in the telephoto end, which makes the configuration of the mechanism difficult. If this is attempted to be avoided, the fourth lens group becomes too close to the third lens group, which disables the movement amount of the fourth lens group during photographing of an object existing at point-blank range from being assured.

On the contrary, if $f4/(fw \cdot ft)^{1/2}$ in the conditional expression (5) becomes 0.95 or less, and the focal distance becomes short, the issue of the distance between the fourth lens group and the fifth lens group or between the fourth lens group and the third lens group is solved, but a back focus becomes long, resulting in an unfavorable configuration.

In the zoom lens according to the one embodiment of the present invention, it is desirable to satisfy the following conditional expression (6).

$$1.1 < f3/(fw \cdot ft)^{1/2} < 1.5 \qquad (6)$$

This can make an angle of view at the wide angle end wide while performing favorable aberration correction.

The conditional expression (6) is an expression that defines a range of a magnitude of the refractive power of the third lens group in order to widen the angle of view at the wide angle end.

If $f3/(fw \cdot ft)^{1/2}$ in the conditional expression (6) becomes 1.5 or more, the aberration correction can be performed favorably, but a wider angle cannot be realized.

On the contrary, if $f3/(fw \cdot ft)^{1/2}$ in the conditional expression (6) becomes 1.1 or less, the angle of view at the wide angle end can be widened, but there arises an issue that an image surface is inclined toward the object side at the wide angle end, and an outer diameter of the first lens group becomes large, thereby making the entire zoom lens system large.

In the zoom lens according to the one embodiment of the present invention, it is desirable to satisfy the following conditional expressions (7) and (8).

$$8.5 < f1/fw < 10 \tag{7}$$

$$-0.45 < f2/(fw \cdot ft)^{1/2} < -0.3 \tag{8}$$

where f1 is a composite focal distance of the first lens group, and f2 is a composite focal distance of the second lens group.

This enables reduction in the entire lens length to be realized while achieving a higher variable power.

The conditional expression (7) is an expression relating to an object point, that is, a magnification with respect to the second lens group. For making the lens system small, it is preferable that the second lens group cross the same magnification during zooming. The crossing of the same magnification allows a locus of zooming of the fourth lens group to reciprocate, thereby enabling a higher variable power with the most effective space efficiency.

If f1/fw in the conditional expression (7) becomes 10 or more, the object point with respect to the second lens group becomes far, so that the image formation magnification of the second lens group becomes low, which makes the reduction in size difficult. Moreover, if f1/fw in the conditional expression (7) becomes 10 or more, a distance between the first lens group and the second lens group become large, which make it difficult to achieve the reduction in size.

On the contrary, if f1/fw in the conditional expression (7) becomes 8.5 or less, the image formation magnification of the second lens group becomes large, which makes it difficult to achieve a higher variable power.

The conditional expression (8) is an expression that defines a range of a magnitude of a refractive power that the second lens group has for widening an angle of view at the wide angle end, and represents a range of the magnitude of the refractive power that the second lens group has, which is required for performing favorable aberration correction in the entire zoom area and realizing a wider angle while maintaining a higher variable power ratio.

If $f2/(fw \cdot ft)^{1/2}$ in the conditional expression (8) becomes −0.3 or more, the variable power ratio can be made larger, but the correction of the image surface becomes excessive, which makes it difficult to assure favorable balance between image surface curvature and spherical aberration. Moreover, if $f2/(fw \cdot ft)^{1/2}$ in the conditional expression (8) becomes −0.3 or more, the movement amount of the second lens group becomes large, so that the reduction in size cannot be achieved.

On the contrary, $f2/(fw \cdot ft)^{1/2}$ in the conditional expression (8) becomes −0.45 or less, the balance between the image surface curvature and the spherical aberration becomes favorable, but the realization of a wider angle while maintaining a higher variable power ratio is disabled.

The zoom lens according to the one embodiment of the present invention is a zoom lens preferable for a video camera, a digital still camera or the like, for example, and formation of an image on the imaging element allows an image subjected to photoelectric conversion to be recorded on a memory or a tape recording-medium, so that usability of a user can be improved.

Next, referring to the drawings and tables, specific embodiments of the zoom lens of the present invention and a numeric value examples in which specific numeric values are applied to the embodiments are described.

An aspherical surface is introduced in the respective embodiments, and the aspherical shape is defined by the following mathematical expression (1).

$$x = cy^2/(1+(1-(1+\kappa)c^2y^2)^{1/2}) + Ay^4 + By^6 + \tag{1}$$

In the mathematical expression (1), x is a sag amount, c is a curvature, y is a height from the optical axis, κ is a conical constant, and A, B, . . . are aspherical coefficients.

FIG. 1 shows refractive power distribution of the zoom lens according to the respective embodiments of the present invention. The zoom lens is configured by arraying a first lens group GR1 having a positive refractive power, a second lens group GR2 having a negative refractive power, a third lens group GR3 having a positive refractive power, a fourth lens group GR4 having a positive refractive power, and a fifth lens group GR5 having a positive refractive power in order from the object side to the image side. In the zoom lens, when the power is varied from a wide angle end state to a telephoto end state, the second lens group GR2 is moved to the image side such that a distance between the first lens group GR1 and the second lens group GR2 is increased, and a distance between the second lens group GR2 and the third lens group GR3 is decreased. At this time, the first lens group GR1, the third lens group GR3 and the fifth lens group GR5 are fixed with respect to the optical axis direction, and when the fourth lens group GR4 is moved so as to correct fluctuations in image surface position with the movement of the second lens group GR2, and in addition, is moved toward the object side during close distance focusing.

Figure 2:
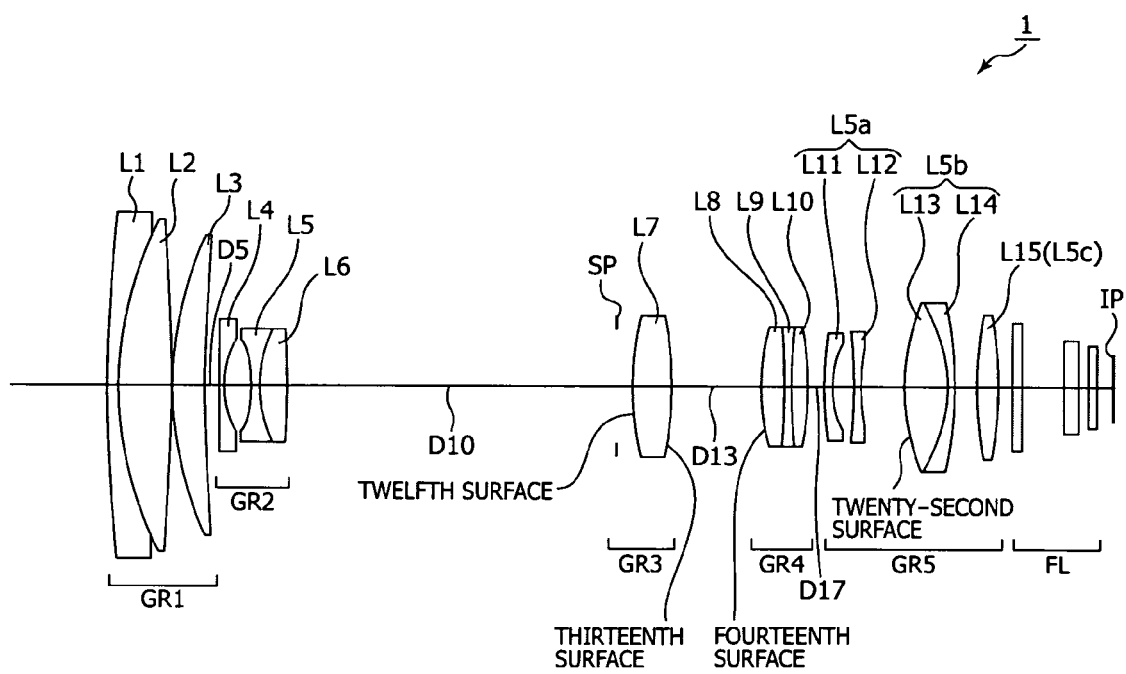
FIG. 2 is a diagram showing a lens configuration of a first embodiment of the zoom lens of the present invention.

FIG. 2 is a diagram showing a lens configuration of a zoom lens 1 according to a first embodiment of the present invention.

In the first lens group GR1, a negative lens (first lens) L1 having a concave meniscus shape with a convex surface facing the object side, a positive lens (second lens) L2 which is a convex lens cemented to the negative lens L1, and a positive lens (third lens) L3 having a convex meniscus shape with a convex surface facing the object side are located in order from the object side to the image side.

In the second lens group GR2, a negative lens (fourth lens) L4 having a concave meniscus shape with a convex surface facing the object side, a biconcave lens (fifth lens) L5, and a biconvex lens (sixth lens) L6 cemented to the biconcave lens L5 are located in order from the object side to the image side.

The third lens group GR3 is made up of a biconvex lens (seventh lens) L7 having aspherical surfaces on both surfaces thereof.

In the fourth lens group GR4, three lenses of a biconvex lens (eighth lens) L8 having an aspherical surface on an object side surface, a biconcave lens (ninth lens) L9, and a biconvex lens (tenth lens) L10 are cemented in order from the object side to the image side.

In the fifth lens group GR5, a negative lens (eleventh lens) L1 having a meniscus shape with a convex surface facing the object side, a biconcave lens (twelfth lens) L12, a biconvex lens (thirteenth lens) L13 having an aspherical surface on an object side surface, a negative lens (fourteenth lens) L14 cemented to the biconvex lens L13 and having a meniscus shape with a concave surface facing the object side, and a biconvex lens (fifteenth lens) L15 are located in order from the object side to the image side.

In the fifth lens group GR5, a 5a-th lens group L5a having a negative refractive power is made up of the negative lens (eleventh lens) L11 and the biconcave lens (twelfth lens) L12, a 5b-th lens group L5b having a negative refractive power is made up of the biconvex lens (thirteenth lens) L13 and the negative lens (fourteenth lens) L14, and a 5c-th lens group L5c having a positive refractive power is made up of the biconvex lens (fifteenth lens) L15.

An aperture diaphragm SP is arranged on the object side of the third lens group GR3, and the aperture diaphragm SP is fixed.

A filter FL is arranged between the fifth lens group GR5 and an image surface IP.

In Table 1, lens data of Numeric Value Example 1 in which specific numeral values are applied to the zoom lens 1 according to the first embodiment is shown.

In Table 1 and tables showing lens data described later, a "surface number" denotes an i-th surface from the object side, a "curvature radius" denotes a curvature radius of the i-th surface from the object side, a "surface distance" denotes a surface distance on the axis between the i-th surface and an (i+1)-th surface from the object side, a "refractive index" denotes a refractive index of a glass material having the i-th surface on the object side with respect toad line, and an "Abbe number" denotes an Abbe number of the glass material having the i-th surface on the object side with respect to the d line. With the curvature radius, "∞" denotes that the surface is a flat surface, and with the surface distance, "(Di)" denotes that the surface distance is a variable distance", and with the surface distance, "(Bf)" denotes back focus.

group GR3, an object side surface (fourteenth surface) of the three cemented lenses of the fourth lens group GR4, and an object side surface (twenty-second surface) of the biconvex lens L13 of the fifth lens group GR5 are formed into aspherical surfaces. Fourth-order, sixth-order, eighth-order, and tenth-order aspherical coefficients A, B, C, D of the aspherical surfaces in Numeric Value Example 1 are shown together with the conical constant κ in Table 2.

In Table 2 and tables showing the aspherical coefficients described later, "E-i" represents an exponential notation with 10 as a base, that is, "$10^{-i}$", and for example, "0.12345E-05" represents "$0.12345 \times 10^{-5}$".

TABLE 2

| | | | |
|---|---|---|---|
| 12th Surface κ = 0.000000 | A = −0.517258E−02 | B = −0.274903E−03 | C = 0.000000E+00 D = 0.000000E+00 |
| 13th Surface κ = 0.000000 | A = −0.138509E−02 | B = 0.736818E−03 | C = −0.217753E−03 D = 0.000000E+00 |
| 14th Surface κ = 0.000000 | A = −0.729880E−02 | B = 0.209368E−02 | C = −0.191226E−02 D = 0.731208E−03 |
| 22nd Surface κ = 2.754614 | A = −0.116739E−01 | B = −0.115376E−02 | C = −0.121967E−03 D = 0.000000E+00 |

In the zoom lens 1, when the power is varied from a wide angle end state to a telephoto end state, a surface distance D5 between the first lens group GR1 and the second lens group GR2, a surface distance D10 between the second lens group GR2 and the third lens group (aperture diaphragm SP) GR3, a surface distance D13 between the third lens group GR3 and the fourth lens group GR4, and a surface distance D17 between the fourth lens group GR4 and the fifth lens group GR5 are varied. Values of the respective surface distances in the wide angle end state (f=1.000), an intermediate focal distance state (f=3.757) and the telephoto end state (f=13.813) in Numeric Value Example 1 are shown together with a focal distance f, an F number Fno., an angle of view 2ω, and a back focus Bf in Table 3.

TABLE 1

| Surface No. | Curvature Radius | Surface Distance | Refractive Index | Abbe No. |
|---|---|---|---|---|
| 1 | 27.02830 | 0.253609 | 1.84666 | 23.8 |
| 2 | 7.12366 | 0.948169 | 1.69680 | 55.5 |
| 3 | −40.86050 | 0.015134 | | |
| 4 | 7.01928 | 0.609747 | 1.83481 | 42.7 |
| 5 | 23.73248 | (D5) | | |
| 6 | 22.75719 | 0.122084 | 1.83481 | 42.7 |
| 7 | 2.14641 | 0.493531 | | |
| 8 | −2.39061 | 0.125971 | 1.83481 | 42.7 |
| 9 | 2.39061 | 0.508593 | 1.92286 | 20.9 |
| 10 | −19.82495 | (D10) | | |
| 11 | ∞ | 0.345177 | | (Aperture Diaphragm) |
| 12 | 4.46842 | 0.743450 | 1.58313 | 59.5 |
| 13 | −7.94988 | (D13) | | |
| 14 | 5.03448 | 0.385070 | 1.69350 | 53.2 |
| 15 | −18.87926 | 0.136065 | 1.94595 | 18.00 |
| 16 | 13.16641 | 0.355275 | 1.62041 | 60.3 |
| 17 | −4.96620 | (D17) | | |
| 18 | 21.88344 | 0.136536 | 18.0420 | 46.5 |
| 19 | 2.33565 | 0.348071 | | |
| 20 | −8.59731 | 0.121068 | 1.69680 | 55.5 |
| 21 | 7.44592 | 0.879590 | | |
| 22 | 3.88622 | 0.724055 | 1.80139 | 45.5 |
| 23 | −3.52609 | 0.151713 | 1.94595 | 18.00 |
| 24 | −7.25140 | 0.458857 | | |
| 25 | 8.54931 | 0.387483 | 1.77250 | 49.6 |
| 26 | −8.54931 | 0.303048 | | |
| 27 | ∞ | 0.130148 | 1.51680 | 64.2 |
| 28 | ∞ | 0.817808 | | |
| 29 | ∞ | 0.230029 | 1.55232 | 63.4 |
| 30 | ∞ | 0.211869 | | |
| 31 | ∞ | 0.151335 | 1.51680 | 64.2 |
| 32 | ∞ | (Bf) | | |

In the zoom lens 1, both surfaces (twelfth surface and thirteenth surface) of the biconvex lens L7 of the third lens

TABLE 3

(Variable Distance Table)

| | | | |
|---|---|---|---|
| f | 1.000 | 3.757 | 13.813 |
| Fno. | 1.853 | 2.357 | 2.615 |
| 2ω | 64.390 | 16.378 | 4.443 |
| D5 | 0.263 | 3.845 | 5.960 |
| D10 | 6.132 | 2.550 | 0.436 |
| D13 | 1.668 | 0.762 | 0.990 |
| D17 | 0.333 | 1.239 | 1.010 |
| Bf | 0.245 | 0.245 | 0.245 |

Values corresponding to the conditional expressions (1) to (8) in Numeric Value Example 1 are shown in Table 4.

TABLE 4

| | |
|---|---|
| (1) | f3/f4 = 1.090 |
| (2) | fw/φ1 = 0.164 |
| (3) | f5c/f5a = −2.806 |
| (4) | $|(1 − \beta a^2) \cdot (\beta b^2)| = 0.395$ |
| (5) | $f4/(fw \cdot ft)^{1/2} = 1.232$ |
| (6) | $f3/(fw \cdot ft)^{1/2} = 1.343$ |
| (7) | f1/fw = 8.931 |
| (8) | $f2/(fw \cdot ft)^{1/2} = −0.413$ |

Figure 3:
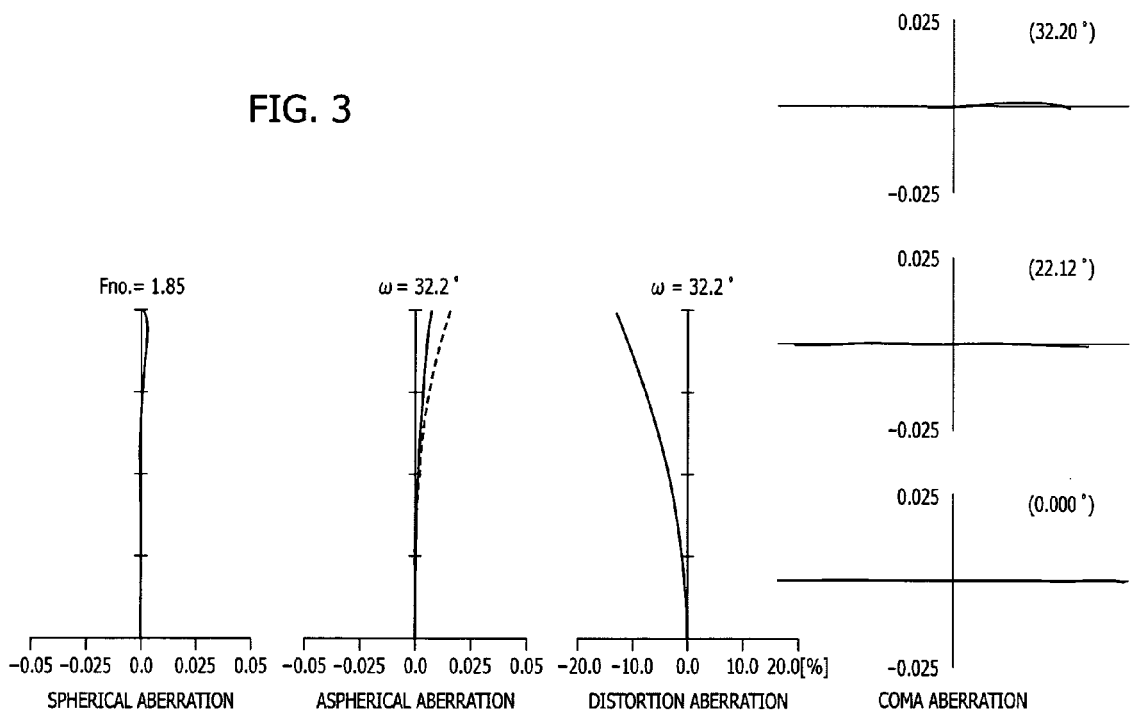
FIG. 3 shows aberration diagrams of Numeric Value Example 1 in which specific numeric values are applied to the first embodiment together with FIGS. 4 and 5, this figure showing spherical aberration, aspherical aberration, distortion aberration and coma aberration in a wide angle end state.
Figure 4:
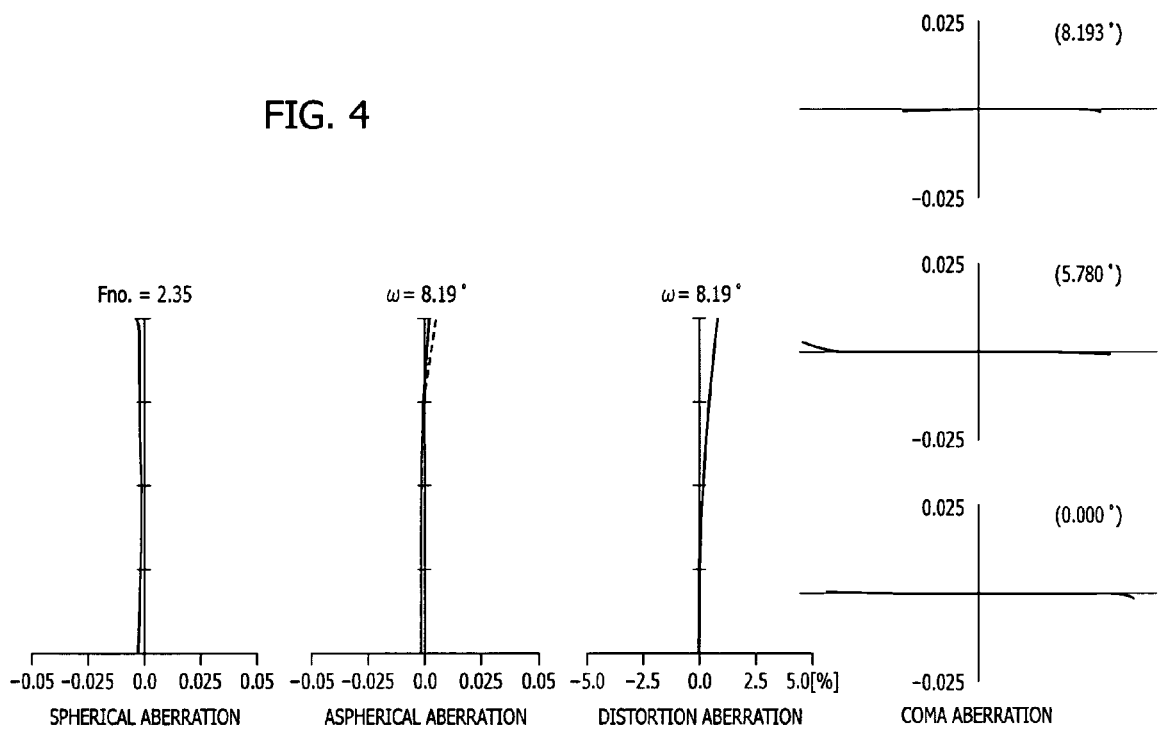
FIG. 4 shows diagrams of spherical aberration, aspherical aberration, distortion aberration and coma aberration in an intermediate focal distance state.
Figure 5:
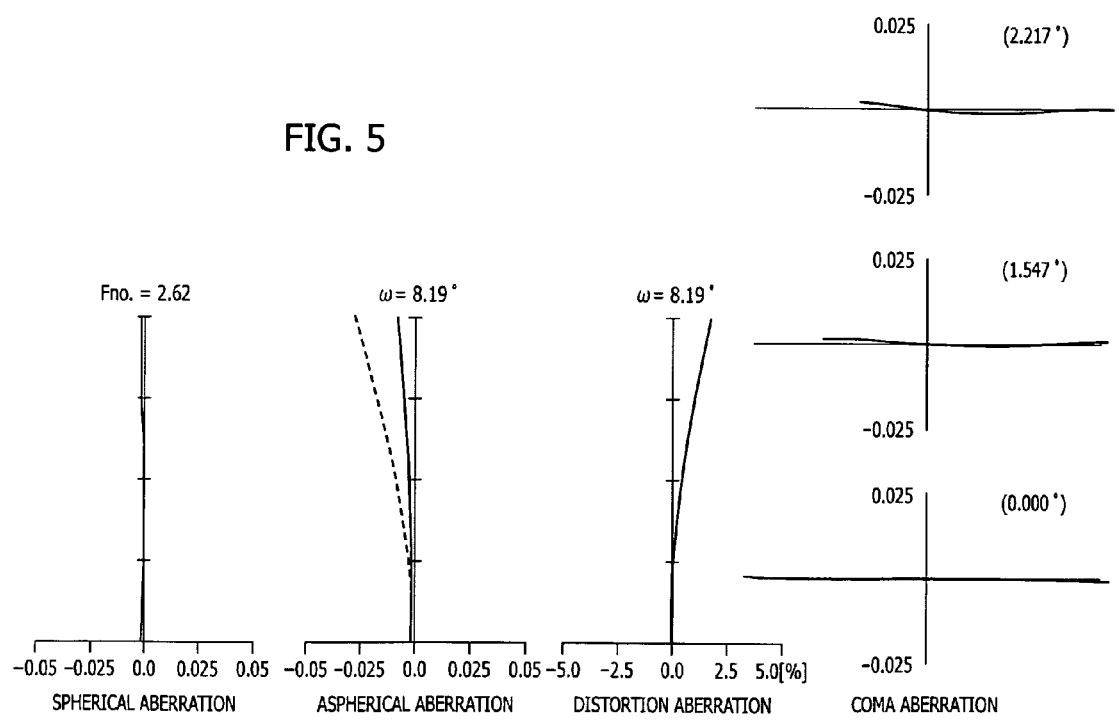
FIG. 5 shows diagrams of spherical aberration, aspherical aberration, distortion aberration and coma aberration in a telephoto end state.

FIGS. 3 to 5 show aberration diagrams in an infinity focusing state of Numeric Value Example 1, FIG. 3 showing aberration diagrams in the wide angle end state (f=1.000), FIG. 4 showing aberration diagrams in the intermediate focal distance state (f=3.757), and FIG. 5 showing aberration diagrams in the telephoto end state (f=13.813).

Figure 6:
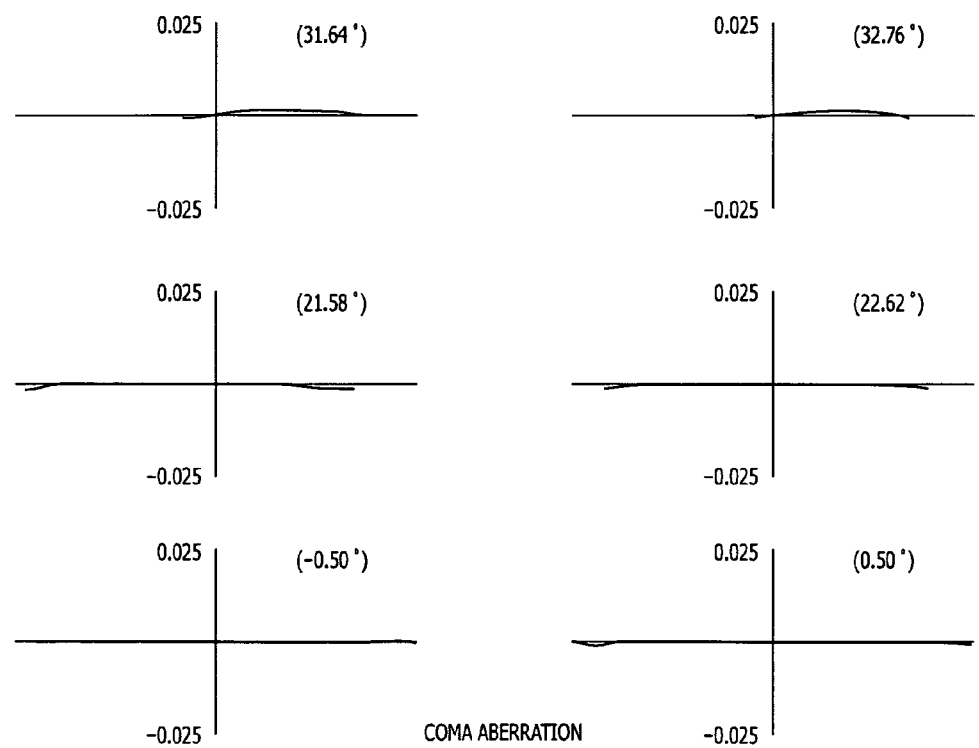
FIG. 6 is a diagram showing coma aberration in a lens shifted state of about 0.5 degree in Numeric Value Example 1 in which the specific numeric values are applied to the first embodiment together with FIGS. 7 and 8, this figure showing coma aberration at the wide angle end.
Figure 7:
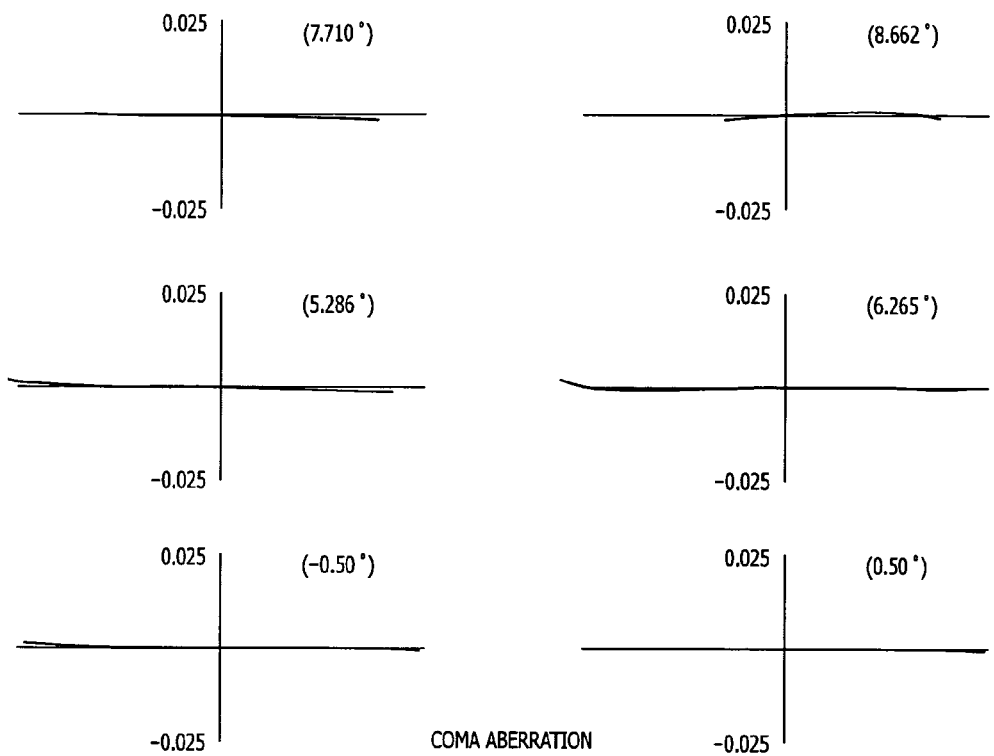
FIG. 7 shows diagrams of coma aberration in the intermediate focal distance state.
Figure 8:
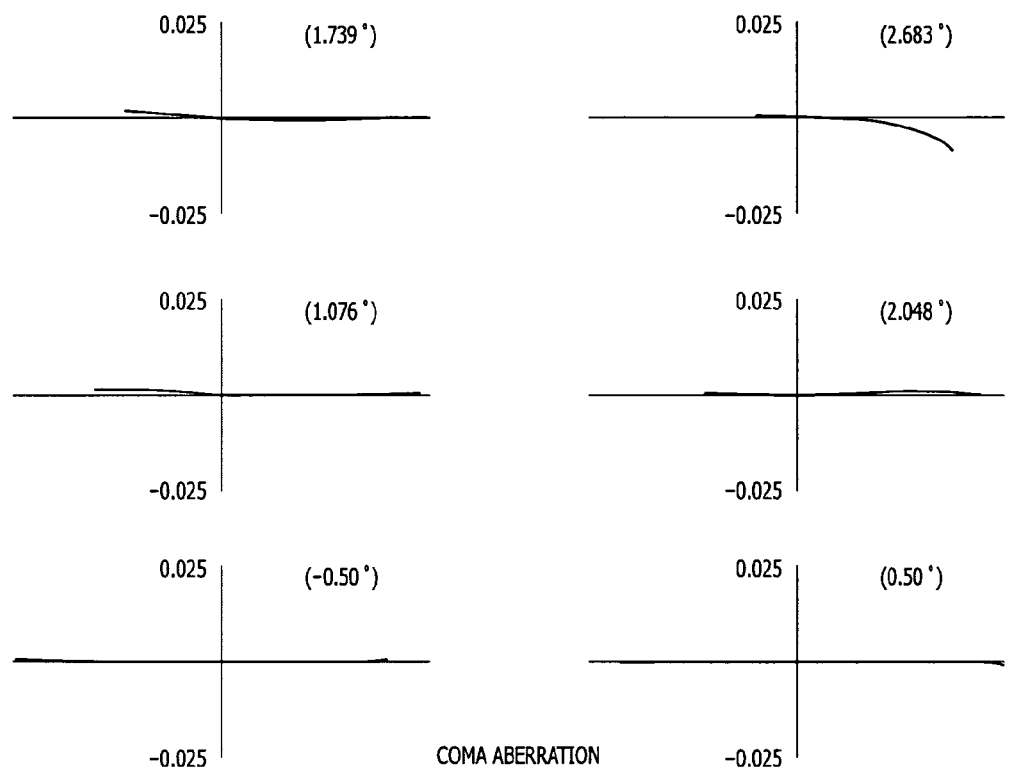
FIG. 8 shows diagrams of coma aberration in the telephoto end state.

FIGS. 6 to 8 show coma aberration in a lens shifted state of about 0.5 degree in the infinity focusing state of Numeric Value Example 1, respectively, FIG. 6 showing the coma aberration in the wide angle end state (f=1.000), FIG. 7 showing the coma aberration in the intermediate focal distance state (f=3.757), and FIG. 8 showing the coma aberration in the telephoto end state (f=13.813).

In each of the aberration diagrams in FIGS. 3 to 8, a solid line in the aspheric aberration diagram indicates a sagittal image surface, and a dashed line indicates a meridional image surface. A parenthetic numeric value in the coma aberration diagram indicates an angle of view.

From the respective aberration diagrams, it is obvious that in Numeric Value Example 1, the respective aberrations are favorably corrected, and that excellent image formation performance is exhibited.

Figure 9:
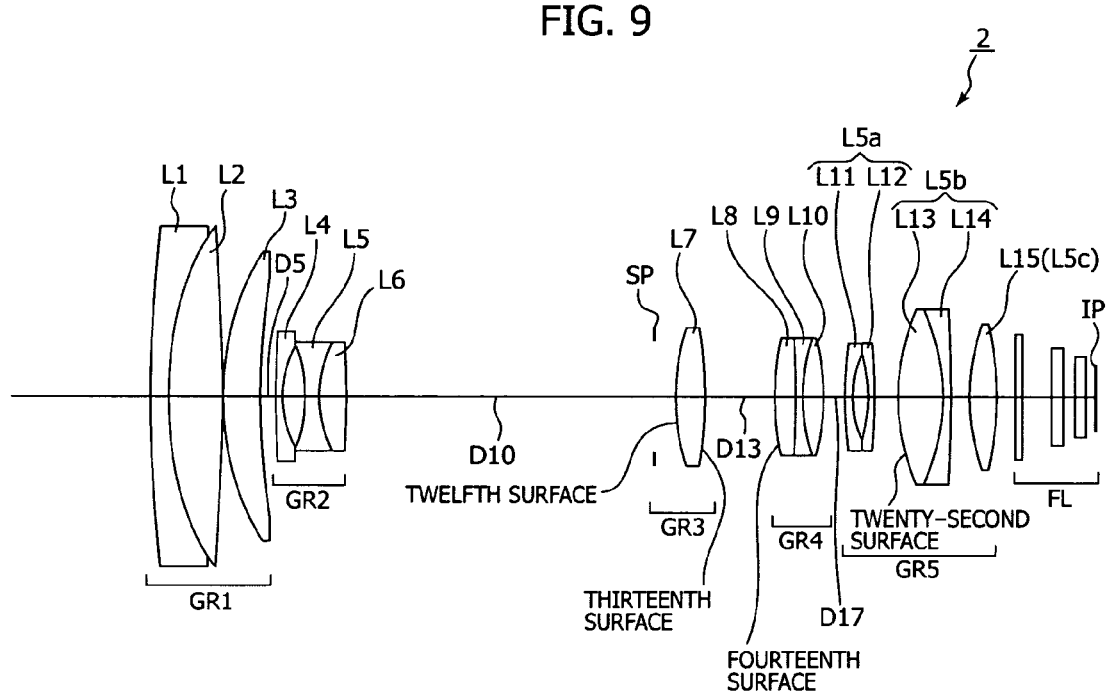
FIG. 9 is a diagram showing a lens configuration of a second embodiment of the zoom lens of the present invention.

FIG. 9 is a diagram showing a lens configuration of a zoom lens 2 according to a second embodiment of the present invention.

In the first lens group GR1, the negative lens (first lens) L1 having a concave meniscus shape with a convex surface facing the object side, the positive lens (second lens) L2 which is a convex lens cemented to the negative lens L1, and the positive lens (third lens) L3 having a convex meniscus shape with a convex surface facing the object side are located in order from the object side to the image side.

In the second lens group GR2, the negative lens (fourth lens) L4 having a concave meniscus shape with a convex surface facing the object side, the biconcave lens (fifth lens) L5, and the biconvex lens (sixth lens) L6 cemented to the biconcave lens L5 are located in order from the object side to the image side.

The third lens group GR3 is made up of the biconvex lens (seventh lens) L7 having aspherical surfaces on both surfaces thereof.

In the fourth lens group GR4, the three lenses of the biconvex lens (eighth lens) L8 having an aspherical surface on an object side surface, the biconcave lens (ninth lens) L9, and the biconvex lens (tenth lens) L10 are cemented in order from the object side to the image side.

In the fifth lens group GR5, the negative lens (eleventh lens) L11 having a meniscus shape with a convex surface facing the object side, the negative lens (twelfth lens) L12 having a meniscus shape with a concave surface facing the object side, the biconvex lens (thirteenth lens) L13 having an aspherical surface on an object side surface, the negative lens (fourteenth lens) L14 cemented to the biconvex lens L13 and having a meniscus shape with a concave surface facing the object side, and the biconvex lens (fifteenth lens) L15 are located in order from the object side to the image side.

In the fifth lens group GR5, the 5a-th lens group L5a having a negative refractive power is made up of the negative lens (eleventh lens) L11 and the negative lens (twelfth lens) L12, the 5b-th lens group L5b having a negative refractive power is made up of the biconvex lens (thirteenth lens) L13 and the negative lens (fourteenth lens) L14, and the 5c-th lens group L5c having a positive refractive power is made up of the biconvex lens (fifteenth lens) L15.

The aperture diaphragm SP is arranged on the object side of the third lens group GR3, and the aperture diaphragm SP is fixed.

The filter FL is arranged between the fifth lens group GR5 and the image surface IP.

In Table 5, lens data of Numeric Value Example 2 in which specific numeral values are applied to the zoom lens 2 according to the second embodiment is shown.

TABLE 5

| Surface No. | Curvature Radius | Surface Distance | Refractive Index | Abbe No. | |
|---|---|---|---|---|---|
| 1 | 35.93039 | 0.318567 | 1.84666 | 23.8 | |
| 2 | 6.73599 | 1.130355 | 1.69680 | 55.5 | |
| 3 | −30.09428 | 0.046203 | | | |
| 4 | 6.53727 | 0.664422 | 1.83400 | 37.3 | |
| 5 | 21.44081 | (D5) | | | |
| 6 | 23.64643 | 0.138268 | 1.88300 | 40.8 | |
| 7 | 2.12205 | 0.520121 | | | |
| 8 | −2.47432 | 0.256120 | 1.83481 | 42.7 | |
| 9 | 2.67883 | 0.476269 | 1.92286 | 20.9 | |
| 10 | −14.84291 | (D10) | | | |
| 11 | ∞ | 0.409071 | | | (Aperture Diaphragm) |
| 12 | 3.59879 | 0.612013 | 1.58313 | 59.5 | |
| 13 | −10.62582 | (D13) | | | |
| 14 | 6.27641 | 0.404313 | 1.69350 | 53.2 | |
| 15 | −26.02255 | 0.121206 | 1.84666 | 23.8 | |
| 16 | 4.43463 | 0.446890 | 1.69680 | 55.5 | |
| 17 | −5.12690 | (D17) | | | |
| 18 | 9.81249 | 0.121206 | 18.0420 | 46.5 | |
| 19 | 1.75829 | 0.353558 | | | |
| 20 | −4.18936 | 0.137738 | 1.69680 | 55.5 | |
| 21 | −11.65768 | 0.463090 | | | |
| 22 | 3.90615 | 0.911491 | 1.76802 | 49.2 | |
| 23 | −3.59573 | 0.185452 | 1.84666 | 23.8 | |
| 24 | −37.74200 | 0.354701 | | | |
| 25 | 4.31912 | 0.516390 | 1.77250 | 49.6 | |
| 26 | −6.94055 | 0.374721 | | | |
| 27 | ∞ | 0.130297 | 1.51680 | 64.2 | |
| 28 | ∞ | 0.645863 | | | |
| 29 | ∞ | 0.212111 | 1.55232 | 63.4 | |
| 30 | ∞ | 0.212111 | | | |
| 31 | ∞ | 0.151508 | 1.51680 | 64.2 | |
| 32 | ∞ | (Bf) | | | |

In the zoom lens 2, both the surfaces (twelfth surface and thirteenth surface) of the biconvex lens. L7 of the third lens group GR3, the object side surface (fourteenth surface) of the three cemented lenses of the fourth lens group GR4, and the object side surface (twenty-second surface) of the biconvex lens L13 of the fifth lens group GR5 are formed into aspherical surfaces. The fourth-order, sixth-order, eighth-order, and tenth-order aspherical coefficients A, B, C, D of the aspherical surfaces in Numeric Value Example 2 are shown together with the conical constant κ in Table 6.

TABLE 6

| | | | | | |
|---|---|---|---|---|---|
| 12th Surface | κ = 0.000000 | A = −0.268380E−02 | B = −0.372041E−02 | C = 0.000000E+00 | D = 0.000000E+00 |
| 13th Surface | κ = 0.000000 | A = 0.382511E−02 | B = −0.505153E−02 | C = 0.532444E−03 | D = 0.000000E+00 |
| 14th Surface | κ = 0.000000 | A = −0.659535E−02 | B = 0.519542E−03 | C = −0.221079E−02 | D = 0.128909E−02 |
| 22nd Surface | κ = 0.000000 | A = −0.256447E−02 | B = −0.251879E−03 | C = −0.158439E−04 | D = 0.000000E+00 |

In the zoom lens 2, when the power is varied from a wide angle end state to a telephoto end state, the surface distance D5 between the first lens group GR1 and the second lens group GR2, the surface distance D10 between the second lens group GR2 and the third lens group (aperture diaphragm SP) GR3, the surface distance D13 between the third lens group GR3 and the fourth lens group GR4 and the surface distance D17 between the fourth lens group GR4 and the fifth lens group GR5 are varied. Values of the respective surface distances in the wide angle end state (f=1.000), an intermediate focal distance state (f=4.083) and the telephoto end state (f=16.985) in Numeric Value Example 2 are shown together with a focal distance f, an F number Fno., an angle of view 2ω, and a back focus Bf in Table 7.

TABLE 7

(Variable Distance Table)

| f | 1.000 | 4.083 | 16.985 |
|---|---|---|---|
| Fno. | 1.880 | 2.376 | 3.212 |
| 2ω | 63.864 | 15.213 | 3.610 |
| D5 | 0.273 | 3.981 | 6.105 |
| D10 | 6.257 | 2.549 | 0.424 |
| D13 | 1.428 | 0.734 | 1.701 |
| D17 | 0.421 | 1.115 | 0.148 |
| Bf | 0.242 | 0.242 | 0.242 |

Values corresponding to the conditional expressions (1) to (8) in Numeric Value Example 2 are shown in Table 8.

TABLE 8

| (1) | f3/f4 = 0.936 |
|---|---|
| (2) | fw/φ1 = 0.168 |
| (3) | f5c/f5a = −1.724 |
| (4) | $|(1 − \beta a^2) \cdot (\beta b^2)| = 0.185$ |
| (5) | $f4/(fw \cdot ft)^{1/2} = 1.209$ |
| (6) | $f3/(fw \cdot ft)^{1/2} = 1.132$ |
| (7) | f1/fw = 8.706 |
| (8) | $f2/(fw \cdot ft)^{1/2} = −0.376$ |

Figure 10:
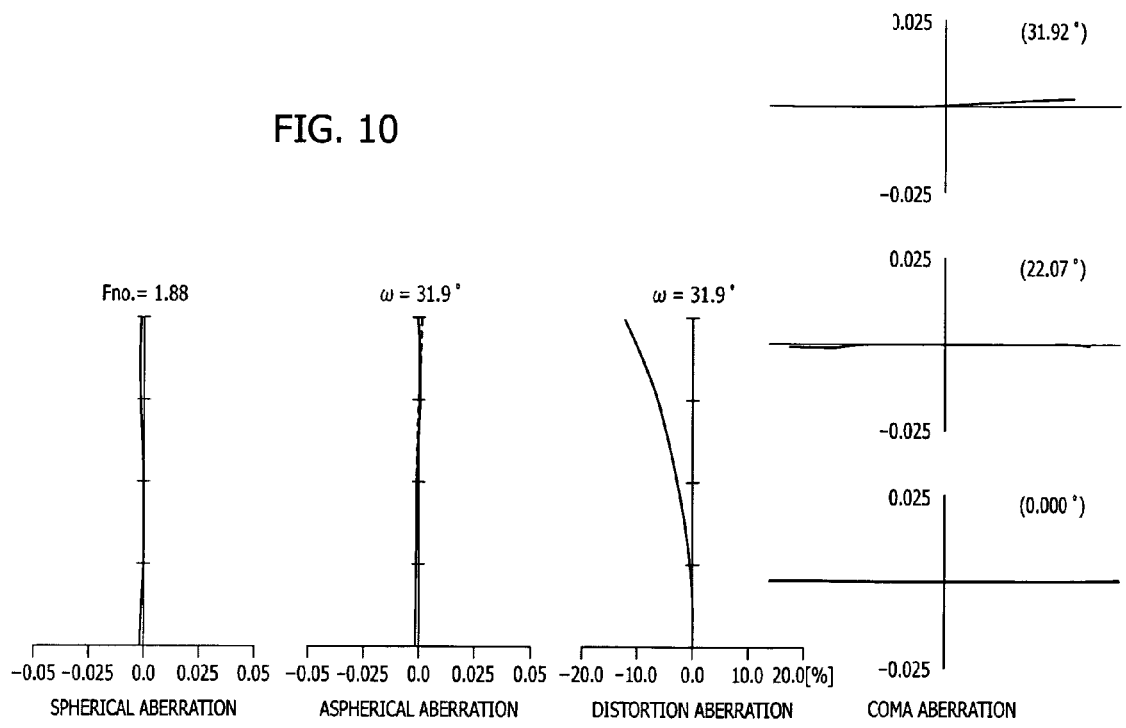
FIG. 10 shows aberration diagrams of Numeric Value Example 2 in which specific numeric values are applied to the second embodiment together with FIGS. 11 and 12, this figure showing spherical aberration, aspherical aberration, distortion aberration and coma aberration in a wide angle end state.
Figure 11:
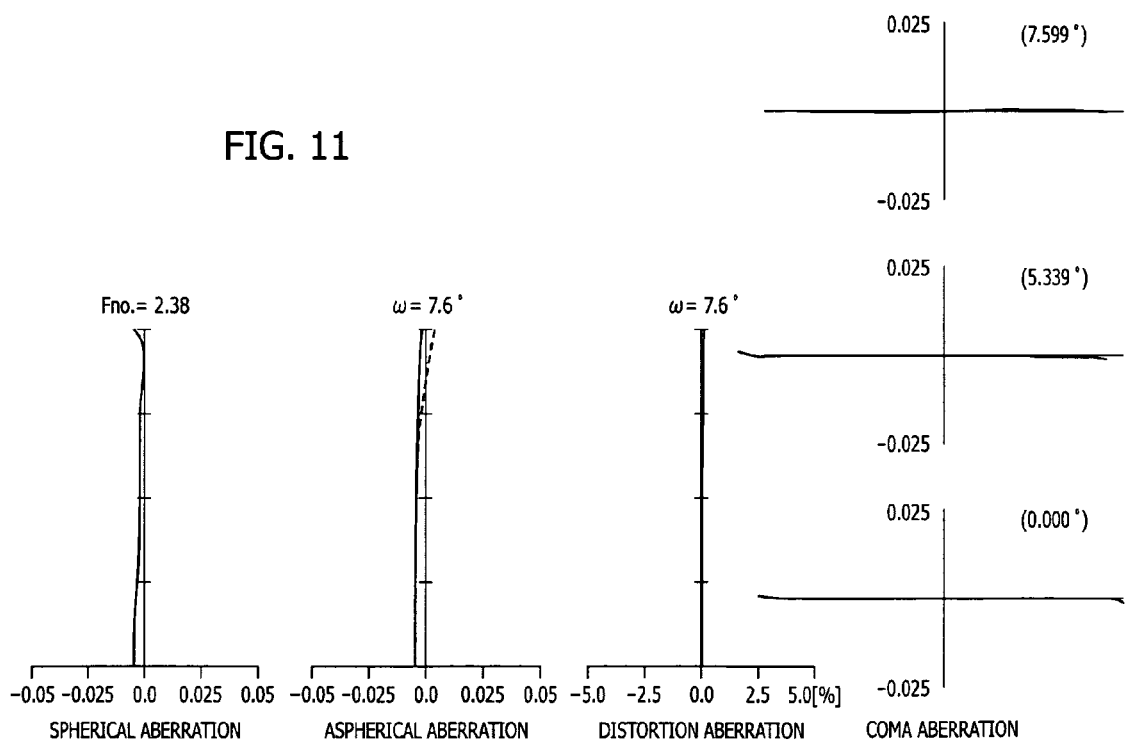
FIG. 11 shows diagrams of spherical aberration, aspherical aberration, distortion aberration and coma aberration in an intermediate focal distance state.
Figure 12:
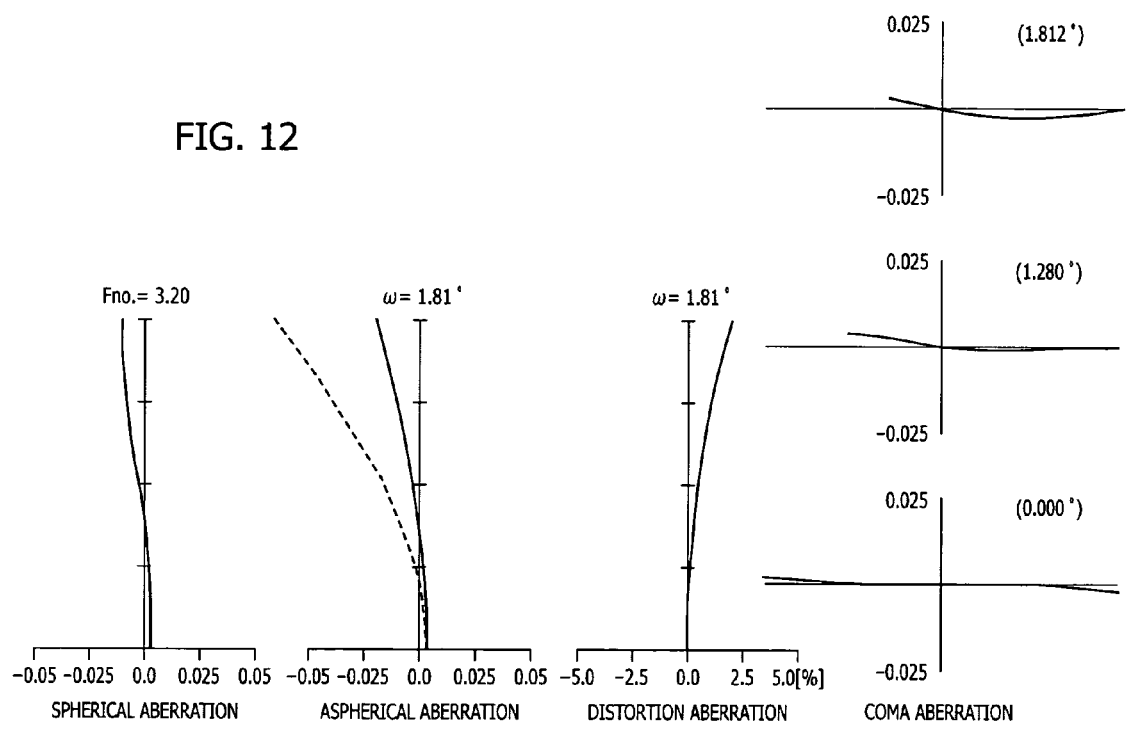
FIG. 12 shows diagrams of spherical aberration, aspherical aberration, distortion aberration and coma aberration in a telephoto end state.

FIGS. 10 to 12 show aberration diagrams in an infinity focusing state of Numeric Value Example 2, FIG. 10 showing aberration diagrams in the wide angle end state (f=1.000), FIG. 11 showing aberration diagrams in the intermediate focal distance state (f=4.083), and FIG. 12 showing aberration diagrams in the telephoto end state (f=16.985).

Figure 13:
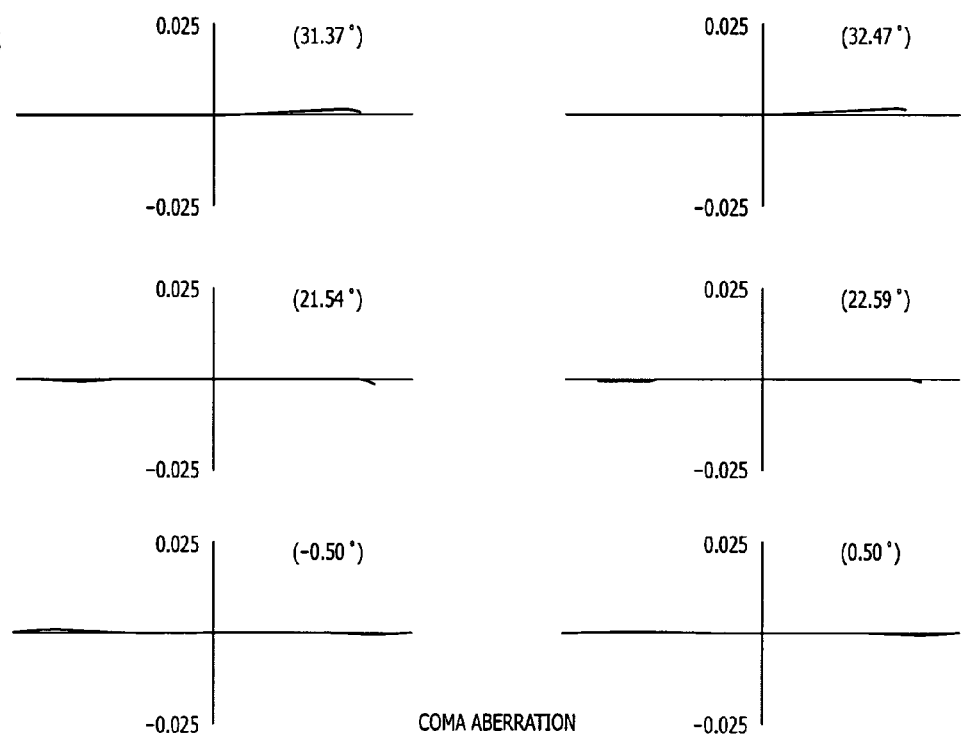
FIG. 13 is a diagram showing coma aberration in a lens shifted state of about 0.5 degree in Numeric Value Example 2 in which the specific numeric values are applied to the second embodiment together with FIGS. 14 and 15, this figure showing coma aberration at the wide angle end.
Figure 14:
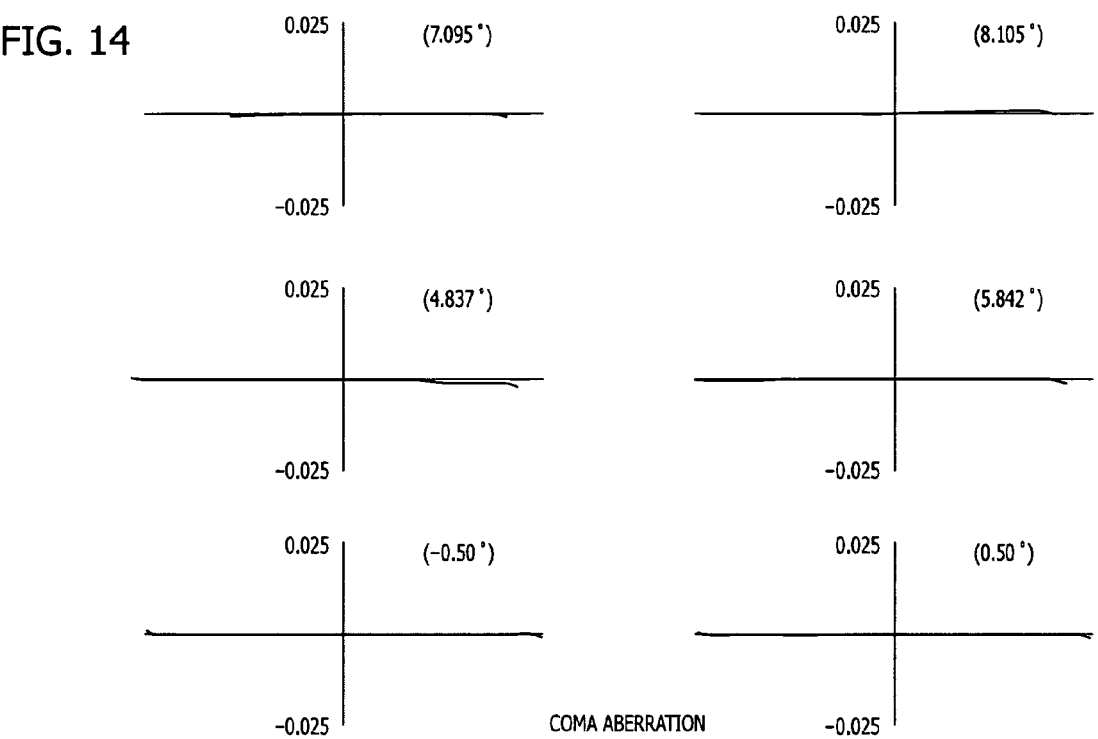
FIG. 14 shows diagrams of coma aberration in the intermediate focal distance state.
Figure 15:
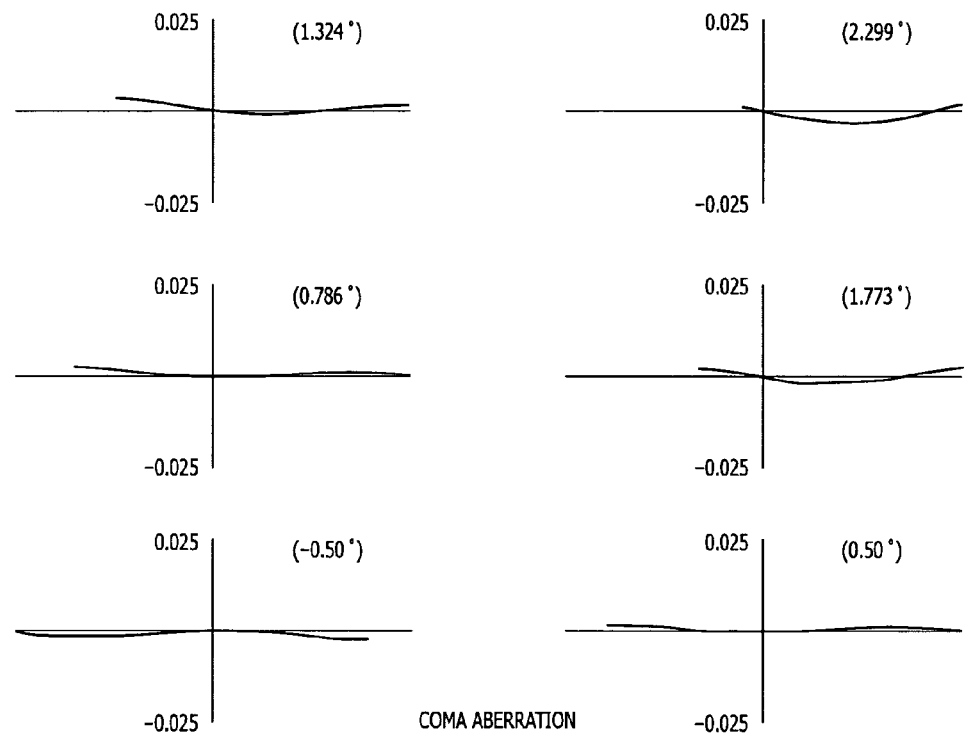
FIG. 15 shows diagrams of coma aberration in the telephoto end state.

FIGS. 13 to 15 show coma aberration in a lens shifted state of about 0.5 degree in the infinity focusing state of Numeric Value Example 2, respectively, FIG. 13 showing coma aberration in the wide angle end state (f=1.000), FIG. 14 showing coma aberration in the intermediate focal distance state (f=4.083), and FIG. 15 showing coma aberration in the telephoto end state (f=16.985).

In each of the aberration diagrams in FIGS. 10 to 15, a solid line in the aspheric aberration diagram indicates a sagittal image surface, and a dashed line indicates a meridional image surface. A parenthetic numeric value in the coma aberration diagram indicates an angle of view.

From the respective aberration diagrams, it is obvious that in Numeric Value Example 2, the respective aberrations are favorably corrected, and that excellent image formation performance is exhibited.

Figure 16:
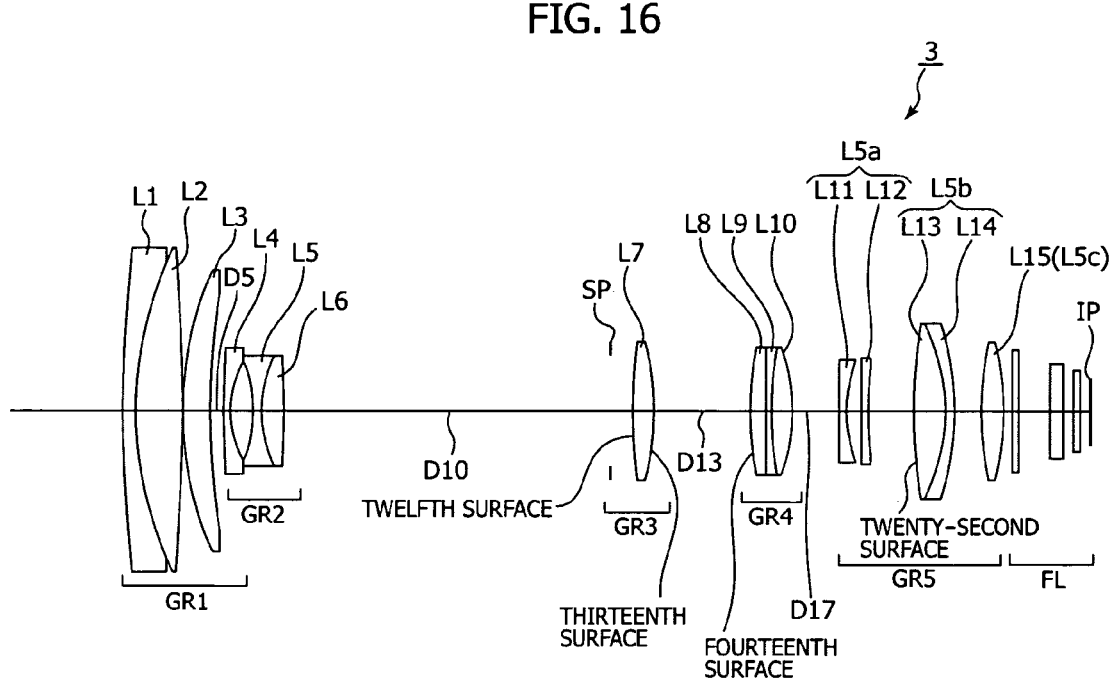
FIG. 16 is a diagram showing a lens configuration of a third embodiment of the zoom lens of the present invention.

FIG. 16 is a diagram showing a lens configuration of a zoom lens 3 according to a third embodiment of the present invention.

In the first lens group GR1, the negative lens (first lens) L1 having a concave meniscus shape with a convex surface facing the object side, the positive lens (second lens) L2 which is a convex lens cemented to the negative lens L1, and the positive lens (third lens) L3 having a convex meniscus shape with a convex surface facing the object side are located in order from the object side to the image side.

In the second lens group GR2, the negative lens (fourth lens) L4 having a concave meniscus shape with a convex surface facing the object side, the biconcave lens (fifth lens) L5, and the biconvex lens (sixth lens) L6 cemented to the biconcave lens L5 are located in order from the object side to the image side.

The third lens group GR3 is made up of the biconvex lens (seventh lens) L7 having aspherical surfaces on both surfaces thereof.

In the fourth lens group GR4, the three lenses of the biconvex lens (eighth lens) L8 having an aspherical surface on an object side surface, the biconcave lens (ninth lens) L9, and the biconvex lens (tenth lens) L10 are cemented in order from the object side to the image side.

In the fifth lens group GR5, the negative lens (eleventh lens) L11 having a meniscus shape with a convex surface facing the object side, the negative lens (twelfth lens) L12 having a meniscus shape with a concave surface facing the object side, the biconvex lens (thirteenth lens) L13 having an aspherical surface on an object side surface, the negative lens (fourteenth lens) L14 cemented to the biconvex lens L13 and having a meniscus shape with a concave surface facing the object side, and the biconvex lens (fifteenth lens) L15 are located in order from the object side to the image side.

In the fifth lens group GR5, the 5a-th lens group L5a having a negative refractive power is made up of the negative lens (eleventh lens) L11 and the negative lens (twelfth lens) L12, the 5b-th lens group L5b having a negative refractive power is made up of the biconvex lens (thirteenth lens) L13 and the negative lens (fourteenth lens) L14, and the 5c-th lens group L5c having a positive refractive power is made up of the biconvex lens (fifteenth lens) L15.

The aperture diaphragm SP is arranged on the object side of the third lens group GR3, and the aperture diaphragm SP is fixed.

The filter FL is arranged between the fifth lens group GR5 and the image surface IP.

In Table 9, lens data of Numeric Value Example 3 in which specific numeral values are applied to the zoom lens 3 according to the third embodiment is shown.

TABLE 9

| Surface No. | Curvature Radius | Surface Distance | Refractive Index | Abbe No. | |
|---|---|---|---|---|---|
| 1 | 34.72290 | 0.239077 | 1.84666 | 23.8 | |
| 2 | 8.09368 | 1.021078 | 1.69680 | 55.5 | |
| 3 | −31.37347 | 0.047609 | | | |
| 4 | 7.47983 | 0.575651 | 1.83481 | 42.7 | |
| 5 | 22.40516 | (D5) | | | |
| 6 | 22.44107 | 0.144979 | 1.88300 | 40.8 | |
| 7 | 2.49123 | 0.498838 | | | |
| 8 | −2.70417 | 0.141502 | 1.88300 | 40.8 | |
| 9 | 1.99783 | 0.546201 | 1.92286 | 20.9 | |
| 10 | −159.18336 | (D10) | | | |
| 11 | ∞ | 0.461668 | | | (Aperture Diaphragm) |
| 12 | 10.80077 | 0.413119 | 1.58313 | 59.5 | |
| 13 | −5.92124 | (D13) | | | |
| 14 | 4.55873 | 0.349515 | 1.69350 | 53.2 | |
| 15 | 2.5008E+13 | 0.142424 | 1.94595 | 18.0 | |
| 16 | 8.28772 | 0.447599 | 1.62041 | 60.3 | |
| 17 | −5.70964 | (D17) | | | |
| 18 | 51.28095 | 0.144178 | 18.0420 | 46.5 | |
| 19 | 2.228067 | 0.397958 | | | |
| 20 | −42.29006 | 0.127357 | 1.69680 | 55.5 | |
| 21 | 9.30549 | 0.955176 | | | |
| 22 | 8.13759 | 0.714967 | 1.80139 | 45.4 | |
| 23 | −3.96275 | 0.189996 | 1.94595 | 18.0 | |
| 24 | −6.30347 | 0.541266 | | | |

TABLE 9-continued

| Surface No. | Curvature Radius | Surface Distance | Refractive Index | Abbe No. |
|---|---|---|---|---|
| 25 | 6.61945 | 0.479693 | 1.77250 | 49.6 |
| 26 | −6.61017 | 0.254714 | | |
| 27 | ∞ | 0.136906 | 1.51680 | 64.2 |
| 28 | ∞ | 0.636784 | | |
| 29 | ∞ | 0.241978 | 1.55232 | 63.4 |
| 30 | ∞ | 0.222874 | | |
| 31 | ∞ | 0.159196 | 1.51680 | 64.2 |
| 32 | ∞ | (Bf) | | |

In the zoom lens 3, both the surfaces (twelfth surface and thirteenth surface) of the biconvex lens L7 of the third lens group GR3, the object side surface (fourteenth surface) of the three cemented lenses of the fourth lens group GR4, and the object side surface (twenty-second surface) of the biconvex lens L13 of the fifth lens group GR5 are formed into aspherical surfaces. The fourth-order, sixth-order, eighth-order, and tenth-order aspherical coefficients A, B, C, D of the above-mentioned surfaces in Numeric Value Example 3 are shown together with the conical constant κ in Table 10.

TABLE 10

| | | | | |
|---|---|---|---|---|
| 12th Surface κ = 0.000000 | A = −0.704612E−02 | B = 0.261123E−03 | C = 0.000000E+00 | D = 0.000000E+00 |
| 13th Surface κ = 0.000000 | A = −0.427024E−02 | B = 0.928556E−03 | C = −0.131625E−03 | D = 0.000000E+00 |
| 14th Surface κ = 0.000000 | A = −0.387826E−02 | B = 0.152750E−02 | C = −0.887326E−03 | D = 0.206853E−03 |
| 22nd Surface κ = 0.000000 | A = −0.468210E−02 | B = 0.183558E−03 | C = −0.11580E−04 | D = 0.000000E+00 |

In the zoom lens 3, when the power is varied from a wide angle end state to a telephoto end state, the surface distance D5 between the first lens group GR1 and the second lens group GR2, the surface distance D10 between the second lens group GR2 and the third lens group (aperture diaphragm SP) GR3, the surface distance D13 between the third lens group GR3 and the fourth lens group GR4 and the surface distance D17 between the fourth lens group GR4 and the fifth lens group GR5 are varied. Values of the respective surface distances in the wide angle end state (f=1.000), an intermediate focal distance state (f=4.427) and the telephoto end state (f=19.993) in Numeric Value Example 3 are shown together with a focal distance f, an F number Fno., an angle of view 2ω, and a back focus Bf in Table 11.

TABLE 11

(Variable Distance Table)

| | | | |
|---|---|---|---|
| f | 1.000 | 4.427 | 19.993 |
| Fno. | 1.887 | 2.400 | 3.612 |
| 2ω | 67.066 | 14.377 | 3.171 |
| D5 | 0.239 | 4.468 | 6.898 |
| D10 | 7.117 | 2.888 | 0.458 |
| D13 | 2.095 | 0.981 | 1.682 |
| D17 | 0.996 | 2.109 | 1.408 |
| Bf | 0.255 | 0.255 | 0.255 |

Values corresponding to the conditional expressions (1) to (8) in Numeric Value Example 3 are shown in Table 12.

TABLE 12

| | |
|---|---|
| (1) | $f3/f4 = 1.418$ |
| (2) | $fw/\phi 1 = 0.162$ |
| (9) | $f5c/f5a = -1.923$ |
| (4) | $|(1 - \beta a^2) \cdot (\beta b^2)| = 0.320$ |
| (5) | $f4/(fw \cdot ft)^{1/2} = 1.040$ |

TABLE 12-continued

| | |
|---|---|
| (6) | $f3/(fw \cdot ft)^{1/2} = 1.474$ |
| (7) | $f1/fw = 9.664$ |
| (8) | $f2/(fw \cdot ft)^{1/2} = -0.339$ |

Figure 17:
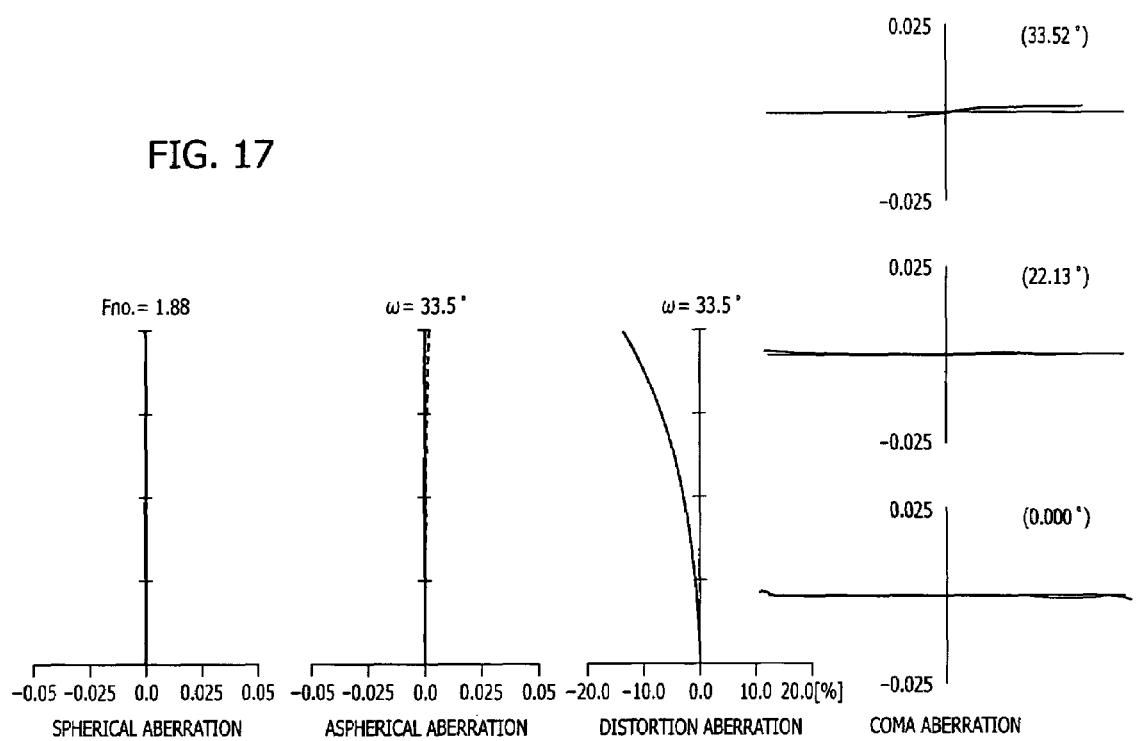
FIG. 17 shows aberration diagrams of Numeric Value Example 3 in which specific numeric values are applied to the third embodiment together with FIGS. 18 and 19, this figure showing spherical aberration, aspherical aberration, distortion aberration and coma aberration in a wide angle end state.
Figure 18:
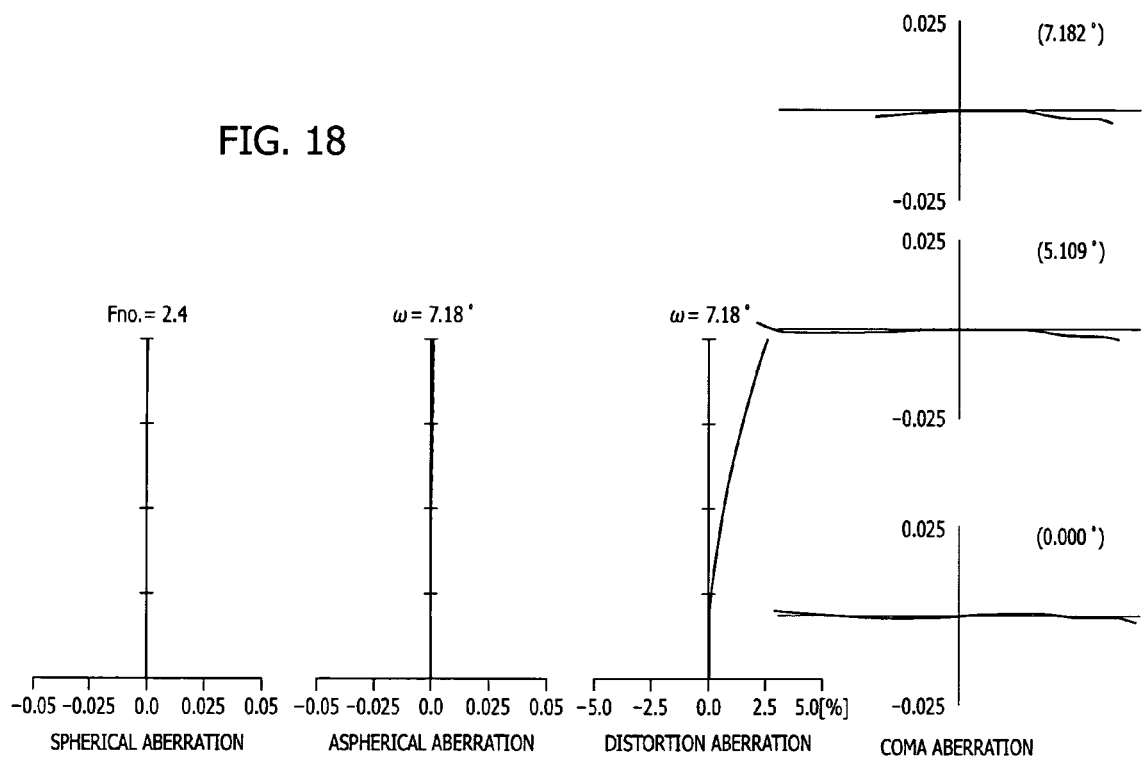
FIG. 18 shows diagrams of spherical aberration, aspherical aberration, distortion aberration and coma aberration in an intermediate focal distance state.
Figure 19:
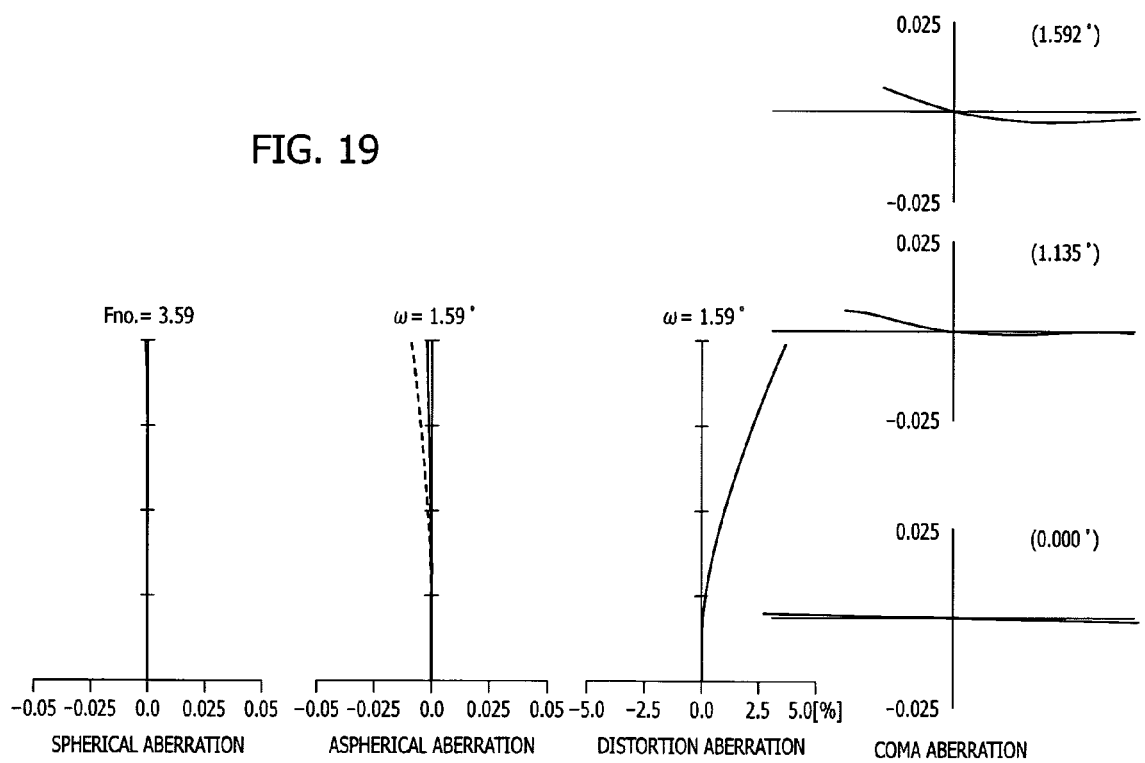
FIG. 19 shows diagrams of spherical aberration, aspherical aberration, distortion aberration and coma aberration in a telephoto end state.

FIGS. 17 to 19 show aberration diagrams in an infinity focusing state of Numeric Value Example 3, FIG. 17 showing aberration diagrams in the wide angle end state (f=1.000), FIG. 18 showing aberration diagrams in the intermediate focal distance state (f=4.427), and FIG. 19 showing aberration diagrams in the telephoto end state (f=19.993).

Figure 20:
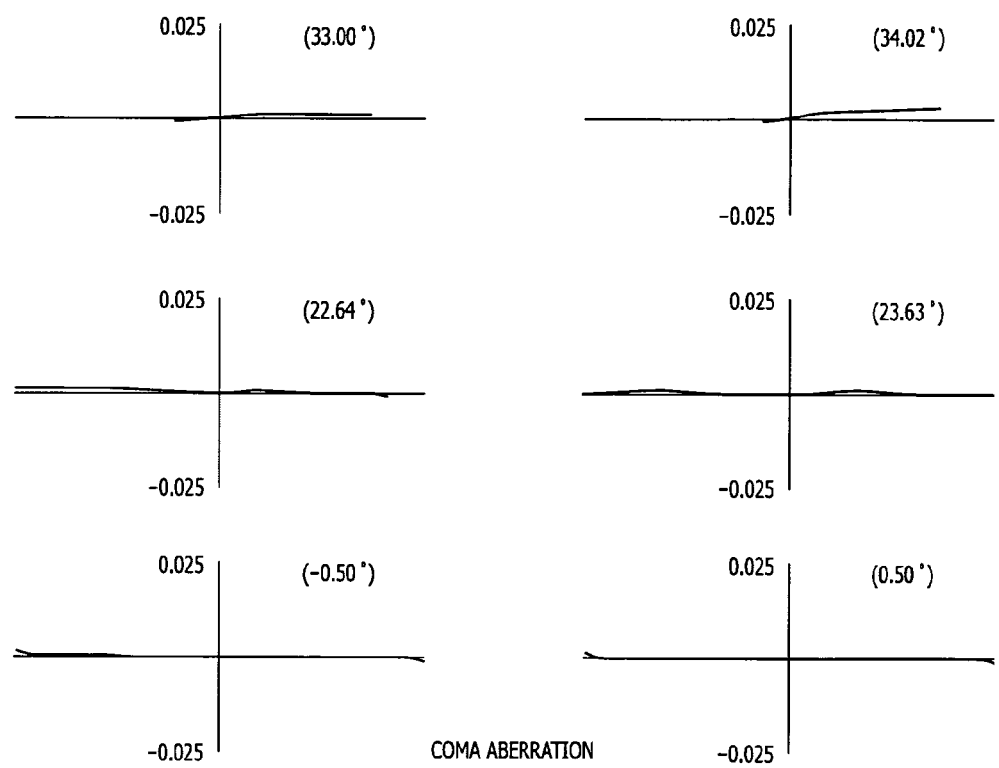
FIG. 20 is a diagram showing coma aberration in a lens shifted state of about 0.5 degree in Numeric Value Example 3 in which the specific numeric values are applied to the third embodiment together with FIGS. 21 and 22, this figure showing coma aberration at the wide angle end.
Figure 21:
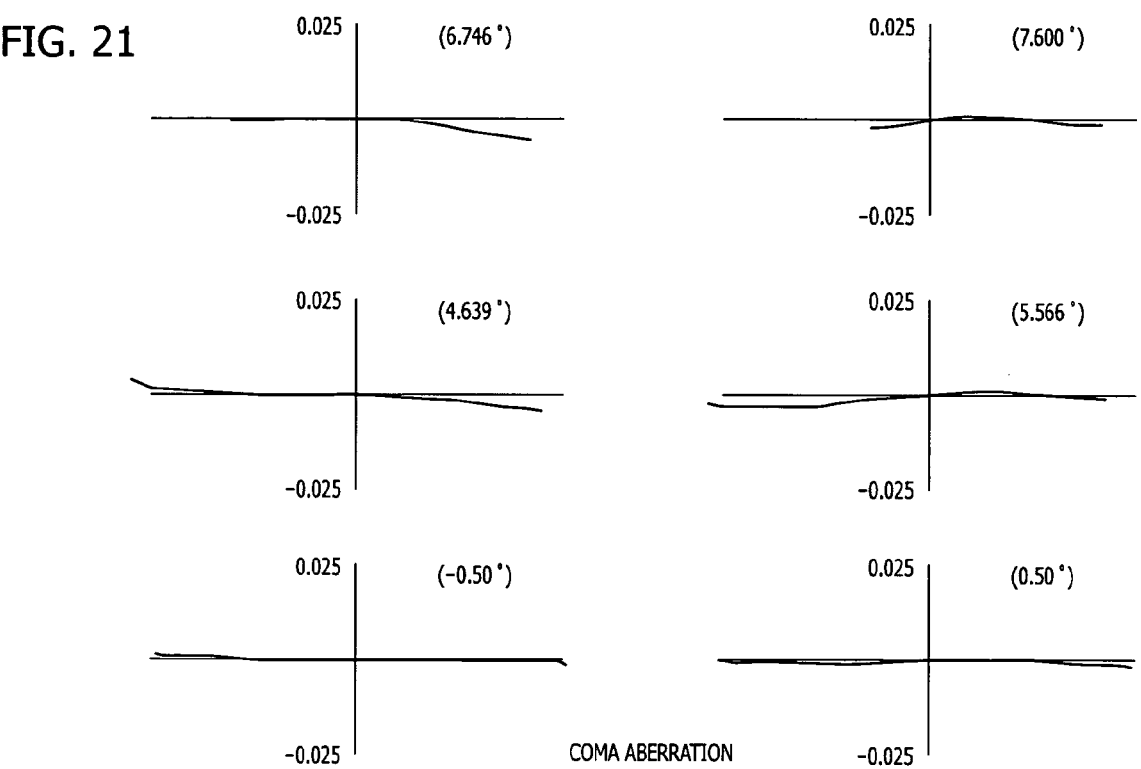
FIG. 21 shows diagrams of coma aberration in the intermediate focal distance state.
Figure 22:
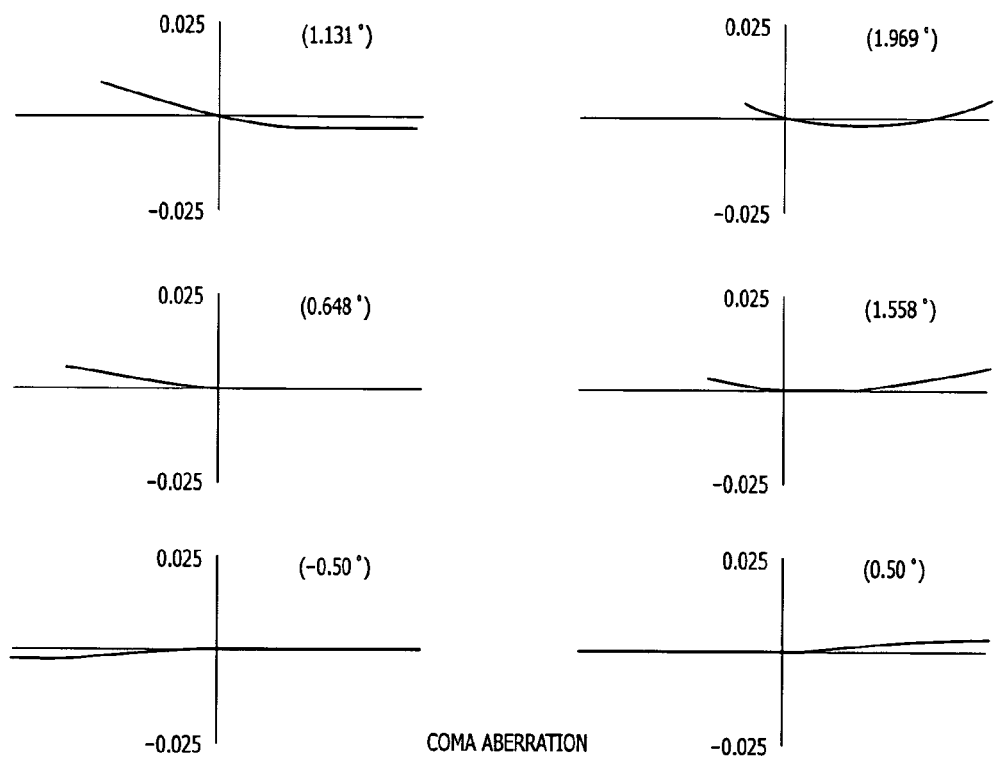
FIG. 22 shows diagrams of coma aberration in the telephoto end state.

FIGS. 20 to 22 show coma aberration in a lens shifted state of about 0.5 degree in the infinity focusing state of Numeric Value Example 3, respectively, FIG. 20 showing coma aberration in the wide angle end state (f=1.000), FIG. 21 showing coma aberration in the intermediate focal distance state (f=4.427), and FIG. 22 showing coma aberration in the telephoto end state (f=19.993).

In each of the aberration diagrams in FIGS. 17 to 22, a solid line in the aspheric aberration diagram indicates a sagittal image surface, and a dashed line indicates a meridional image surface. A parenthetic numeric value in the coma aberration diagram indicates an angle of view.

From the respective aberration diagrams, it is obvious that in Numeric Value Example 3, the respective aberrations are favorably corrected, and that excellent image formation performance is exhibited.

Next, the imaging apparatus of the present invention is described.

An imaging apparatus of the present invention includes a zoom lens and an imaging element that converts an optical image formed by the zoom lens to an electric signal. In the imaging apparatus, the zoom lens of the present invention is configured by arranging a first lens group that has a positive reflective power and is fixed with respect to an optical axis direction, a second lens group that has a negative refractive power and performs a variable power action by moving on an optical axis, a third lens group that has a positive refractive power and is fixed with respect to the optical axis direction, a fourth lens group that has a positive refractive power, and corrects fluctuations in image formation position and in addition, corrects fluctuations in image formation position with changes in object distance by moving on the optical axis, and a fifth lens group that has a positive refractive power and is fixed with respect to the optical axis direction in order from the object side to the image side, and further the zoom lens has an aperture diaphragm on the object side of the third lens group.

In the first lens group, a first lens which is a concave meniscus lens with a convex surface facing the object side, a second lens which is a convex lens cemented to the first lens, and a third lens which is a convex meniscus lens with a convex surface facing the object side are located in order from the object side to the image side.

In the second lens group, a fourth lens which is a concave meniscus lens with a convex surface facing the object side, a fifth lens which is a biconcave lens, and a sixth lens which is a convex lens cemented to the fifth lens are located in order from the object side to the image side.

The third lens group is made up of a seventh lens which is a convex lens, the fourth lens group is made up of at least two or more cemented lenses, and the third lens group and the fourth lens group include at least one surface formed into an aspherical surface.

In the fifth lens group, a 5a-th lens group having a negative refractive power and a 5b-th lens group having a negative refractive power, and a 5c-th lens group having a positive refractive power are located in order from the object side to the image side. The 5a-th lens group is made up of two negative lenses, and the 5b-th lens group can be moved so as to have a component in a direction perpendicular to the optical axis, and displace an image.

The zoom lens configured as described above satisfies the following conditional expressions (1) to (4):

$$0.8 < f3/f4 < 1.5 \quad (1)$$

$$0.15 < fw/\phi1 < 0.17 \quad (2)$$

$$-3.0 < f5c/f5a < -1.5 \quad (3)$$

$$0.15 < |\{1-(\beta a)^2\} \cdot (\beta b)^2| < 0.45 \quad (4)$$

where f3 is a composite focal distance of the third lens group, f4 is a composite focal distance of the fourth lens group, fw is a focal distance in the entire lens system in a wide angle end state, $\phi1$ is an effective diameter of an object side surface of the first lens, f5c is a composite focal distance of the 5c-th lens group, f5a is a composite focal distance of the 5a-th lens group, $\beta a$ is a lateral magnification of the 5a-th lens group, and $\beta b$ is a lateral magnification of the 5b-th lens group.

Accordingly, in the imaging apparatus of the present invention, the second lens group is moved in the optical axis direction to vary power, the fourth lens group is moved in the optical axis direction to correct fluctuations in image formation position with the power variation, and in addition, the fourth lens group is moved to perform focusing, by which effective utilization of a space between the third lens group and the fourth lens group is achieved, so that reduction in entire lens length can be effectively attained.

Moreover, by satisfying the conditional expressions (1) to (4), reduction in entire lens length, aberration correction at the wide angle end and in the intermediate focus area, and alleviation of performance deterioration caused by relative decentering between the 5a-th lens group and the 5c-th lens group during assembling of the lens system, and alleviation of performance deterioration caused by backlash of the camera shake correction group in the optical axis direction can be achieved.

Figure 23:
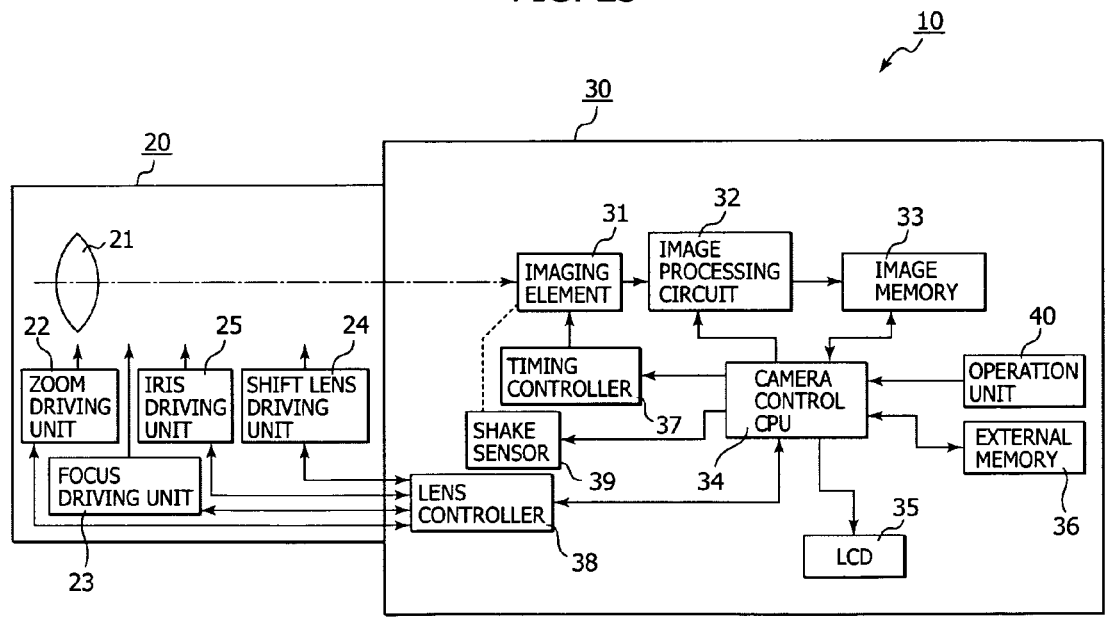
FIG. 23 is a block diagram showing one embodiment of an imaging apparatus of the present invention.

FIG. 23 shows a block diagram of a digital still camera according to one embodiment of the imaging apparatus of the present invention.

An imaging apparatus (digital still camera) 10 includes a lens part 20 that optically acquires a subject image, a camera body part 30 that converts the subject image acquired by the lens part 20 to an electric image signal as an optical image to apply various types of processing to the converted electric image signal, and in addition, has a function of controlling the lens part 20.

The lens part 20 includes a zoom lens 21 made up of optical elements such as a lens, a filter and the like, a zoom driving unit 22 that moves the movable lens group in zooming, a focus driving unit 23 that moves the movable lens group in focusing, a shift lens driving unit 24 that shifts the shift lens group in a direction where it will have a component perpendicular to the optical axis during the camera shake correction or the like, and an iris driving unit 25 that controls a size of an aperture system of the aperture diaphragm.

To the zoom lens 21, any one of the above-described zoom lenses 1 to 3, or the zoom lens of the present invention in Numeric Value Examples 1 to 3 and the like can be applied.

The camera body part 30 includes an imaging element 31 that converts the optical image taken in through the zoom lens 21 to the electric image signal.

As the imaging element 31, for example, a CCD (Charge Coupled Device), a CMOS (Complementary Metal-Oxide Semiconductor) and the like can be applied. The electric image signal outputted from the imaging element 31 is subjected to various types of processing by an image processing circuit 32, and then is subjected to data compression in a predetermined method to be temporarily stored in an image memory 33 as image data.

A camera control CPU 34 (Central Processing Unit) 34 has a function of performing the overall control of the camera body part 30 and the lens part 20, and reads the image data temporarily stored in the image memory 33 to display on a liquid crystal display device (LCD) 35 or store in an external memory 36. The camera control CPU 34 also reads image data stored in the external memory 36 to display on the liquid crystal display device 35.

When an operation unit 40 such as a shutter release switch, a zooming switch and the like is operated, a signal in accordance with this operation is inputted to the camera control CPU 34, the respective units are controlled by the camera control CPU 34 based on the inputted signal. For example, when the shutter release switch is operated, a command signal is sent from the camera control CPU 34 to a timing controller 37, and a light beam taken in through the zoom lens 21 is inputted to the imaging element 31, and signal read timing of the imaging element 31 is controlled by the timing controller 37.

Signals relating to the control of the zoom lens 21, for example, an AF (Auto Focus) signal, an AE (Auto Exposure) signal, a zooming signal and the like are sent from the camera control CPU 34 to a lens controller 38, which controls the zoom driving unit 22, the focus driving unit 23 and the iris driving unit 25 to bring the zoom lens 21 into a predetermined state.

The imaging apparatus 10 is provided with a shake sensor 39 that senses shake caused by vibration of the imaging element 31 or the like, and when the shake sensor 39 senses the shake, a sensing signal thereof is inputted to the camera control CPU 34, and a correction signal is generated by the camera control CPU 34 to be sent out to the shift lens driving unit 24 of the camera part 20 through the lens controller 38. Once the correction signal is inputted to the shift lens driving unit 24, the shift lenses (the 5b lens group of the above-described fifth lens group 5L) are moved by the shift lens driving unit 24 in a direction where the displacement of the image in the imaging element 31 due to the shake will be cancelled.

While in the above-described embodiments, the examples in which the imaging apparatus is applied to the digital still camera are described, the application range of the imaging apparatus is not limited to the digital still camera, and the imaging apparatus can also be applied as a digital video camera.

The shapes and the numeric values of the respective parts shown in the above-described embodiments are only examples of embodiment for carrying out the present invention, and the technical scope of the present invention should not be construed in a limited way from these.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-334755 filed in the Japanese Patent Office on Dec. 26, 2007, the entire content of which being incorporated herein by reference.

What is claimed is:

1. A zoom lens configured by arranging a first lens group that has a positive reflective power and is fixed with respect to an optical axis direction, a second lens group that has a negative refractive power and performs a variable power action by moving on an optical axis, a third lens group that has a positive refractive power and is fixed with respect to the optical axis direction, a fourth lens group that has a positive refractive power, and corrects fluctuations in image formation position and in addition, corrects fluctuations in image formation position with changes in object distance by moving on the optical axis, and a fifth lens group that has a positive refractive power and is fixed with respect to the optical axis direction in order from the object side to the image side, and further having an aperture diaphragm on the object side of the third lens group, wherein in the first lens group, a first lens which is a concave meniscus lens with a convex surface facing the object side, a second lens which is a convex lens cemented to the first lens, and a third lens which is a convex meniscus lens with a convex surface facing the object side are located in order from the object side to the image side, in the second lens group, a fourth lens which is a concave meniscus lens with a convex surface facing the object side, a fifth lens which is a biconcave lens, and a sixth lens which is a convex lens cemented to the fifth lens are located in order from the object side to the image side, the third lens group is made up of a seventh lens which is a convex lens, the fourth lens group is made up of at least two or more cemented lenses, the third lens group and the fourth lens group include at least one surface formed into an aspherical surface, in the fifth lens group, a 5a-th lens group having a negative refractive power, a 5b-th lens group having a negative refractive power, and a 5c-th lens group having a positive refractive power are located in order from the object side to the image side, and the 5a-th lens group is made up of two negative lenses, the 5b-th lens group can be moved so as to have a component in a direction perpendicular to the optical axis, and displace an image, the zoom lens satisfying the following conditional expressions (1) to (4):

$$0.8 < f3/f4 < 1.5 \tag{1}$$

$$0.15 < fw/\phi 1 < 0.17 \tag{2}$$

$$-3.0 < f5c/f5a < -1.5 \tag{3}$$

$$0.15 < |\{1-(\beta a)^2\} \cdot (\beta b)^2| < 0.45 \tag{4}$$

where f3 is a composite focal distance of the third lens group, f4 is a composite focal distance of the fourth lens group, fw is a focal distance in the entire lens system in a wide angle end state, $\phi 1$ is an effective diameter of an object side surface of the first lens, f5c is a composite focal distance of the 5c-th lens group, f5a is a composite focal distance of the 5a-th lens group, βa is a lateral magnification of the 5a-th lens group, and βb is a lateral magnification of the 5b-th lens group.

2. The zoom lens according to claim 1, wherein the fourth lens group is made up of cemented lenses in which an eighth lens which is a convex lens with a convex surface facing the object side, a ninth lens which is a concave lens, and a tenth lens which is a convex lens are cemented in order from the object side, and at least a surface of the fourth lens group closest to an object is formed into an aspherical surface.

3. The zoom lens according to claim 1, satisfying the following conditional expression (5):

$$0.95 < f4/(fw \cdot ft)^{1/2} < 1.3 \tag{5}$$

where ft is a focal distance in the entire lens system in a telephoto end state.

4. The zoom lens according to claim 1, satisfying the following conditional expression (6):

$$1.1 < f3/(fw \cdot ft)^{1/2} < 1.5 \tag{6}.$$

5. The zoom lens according to claim 1, satisfying the following conditional expressions (7) and (8):

$$8.5 < f1/fw < 10 \tag{7}$$

$$-0.45 < f2/(fw \cdot ft)^{1/2} < -0.3 \tag{8}$$

where f1 is a composite focal distance of the first lens group, and f2 is a composite focal distance of the second lens group.

6. An imaging apparatus including a zoom lens and an imaging element that converts an optical image formed by the zoom lens to an electric signal, the zoom lens being configured by arranging a first lens group that has a positive reflective power and is fixed with respect to an optical axis direction, a second lens group that has a negative refractive power and performs a variable power action by moving on an optical axis, a third lens group that has a positive refractive power and is fixed with respect to the optical axis direction, a fourth lens group that has a positive refractive power, and corrects fluctuations in image formation position and in addition, corrects fluctuations in image formation position with changes in object distance by moving on the optical axis, and a fifth lens group that has a positive refractive power and is fixed with respect to the optical axis direction in order from the object side to the image side, and the zoom lens further having an aperture diaphragm on the object side of the third lens group, wherein in the first lens group, a first lens which is a concave meniscus lens with a convex surface facing the object side, a second lens which is a convex lens cemented to the first lens, and a third lens which is a convex meniscus lens with a convex surface facing the object side are located in order from the object side to the image side, in the second lens group, a fourth lens which is a concave meniscus lens with a convex surface facing the object side, a fifth lens which is a biconcave lens, and a sixth lens which is a convex lens cemented to the fifth lens are located in order from the object side to the image side, the third lens group is made up of a seventh lens which is a convex lens,
the fourth lens group is made up of at least two or more cemented lenses,
the third lens group and the fourth lens group include at least one surface formed into an aspherical surface,
in the fifth lens group, a 5a-th lens group having a negative refractive power, a 5b-th lens group having a negative refractive power, and a 5c-th lens group having a positive refractive power are located in order from the object side to the image side,
the 5a-th lens group is made up of two negative lenses, and
the 5b-th lens group can be moved so as to have a component in a direction perpendicular to the optical axis, and displace an image,
the imaging apparatus satisfying the following conditional expressions (1) to (4):

$$0.8 < f3/f4 < 1.5 \tag{1}$$

$$0.15 < fw/\phi 1 < 0.17 \tag{2}$$

$$-3.0 < f5c/f5a < -1.5 \tag{3}$$

$$0.15 < |\{1-(\beta a)^2\} \cdot (\beta b)^2| < 0.45 \tag{4}$$

where f3 is a composite focal distance of the third lens group, f4 is a composite focal distance of the fourth lens group, fw is a focal distance in the entire lens system in a wide angle end state, $\phi 1$ is an effective diameter of an object side surface of the first lens, f5c is a composite focal distance of the 5c-th lens group, f5a is a composite focal distance of the 5a-th lens group, $\beta a$ is a lateral magnification of the 5a-th lens group, and $\beta b$ is a lateral magnification of the 5b-th lens group.

* * * * *